(12) United States Patent
Sun et al.

(10) Patent No.: US 10,834,715 B2
(45) Date of Patent: Nov. 10, 2020

(54) PERFORMING SELECTIVE SCHEDULING ON UPLINK FREQUENCIES USING SOUNDING REFERENCE SIGNALS (SRS)

(71) Applicant: HUAWEI TECHNOLOGIES CO., LTD., Shenzhen (CN)

(72) Inventors: Hao Sun, Beijing (CN); Yan Cheng, Beijing (CN); Lixia Xue, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/933,154

(22) Filed: Mar. 22, 2018

(65) Prior Publication Data

US 2018/0213513 A1 Jul. 26, 2018

Related U.S. Application Data

(63) Continuation of application No. PCT/CN2015/090698, filed on Sep. 25, 2015.

(51) Int. Cl.
*H04W 72/04* (2009.01)
*H04J 11/00* (2006.01)
(Continued)

(52) U.S. Cl.
CPC ........... *H04W 72/042* (2013.01); *H04J 11/00* (2013.01); *H04L 5/0048* (2013.01);
(Continued)

(58) Field of Classification Search
CPC ........... H04W 72/042; H04W 72/0453; H04W 84/042; H04L 5/0048; H04L 27/2649; H04L 5/0053; H04J 11/00
See application file for complete search history.

(56) References Cited

U.S. PATENT DOCUMENTS 8,917,687 B2* 12/2014 Shi ................. H04L 5/0023
370/252
9,628,140 B2* 4/2017 Xie ................. H04B 1/7143
(Continued)

FOREIGN PATENT DOCUMENTS

CN 101594683 A 12/2009
CN 102655680 A 9/2012
(Continued)

*Primary Examiner* — Ian N Moore
*Assistant Examiner* — Rushil Parimal Sampat
(74) *Attorney, Agent, or Firm* — Womble Bond Dickinson (US) LLP

(57) ABSTRACT

A data transmission method applied to a base station and user equipment (UE). The base station determines configuration information of a PUCCH and configuration information of an SRS, and sends the configuration information of the PUCCH and the configuration information of the SRS to the UE in a cell. The UE determines, according to the configuration information of the PUCCH, a frequency-domain resource for transmitting the PUCCH, and determines, according to the configuration information of the SRS, a frequency-domain resource for transmitting the SRS. The base station receives, according to the configuration information of the PUCCH, a subcarrier that carries the PUCCH sent by the UE, and demodulates the subcarrier to obtain the PUCCH. The base station receives, according to the configuration information of the SRS, a subcarrier that carries the SRS sent by the UE, and demodulates the subcarrier to obtain the SRS.

18 Claims, 15 Drawing Sheets

(51) Int. Cl.
    *H04L 5/00*       (2006.01)
    *H04L 27/26*    (2006.01)
    *H04W 84/04*   (2009.01)

(52) U.S. Cl.
    CPC ..... *H04L 27/2649* (2013.01); *H04W 72/0453* (2013.01); *H04L 5/0053* (2013.01); *H04W 84/042* (2013.01)

(56) References Cited

U.S. PATENT DOCUMENTS

| | | |
|---|---|---|
| 2012/0033587 A1 | 2/2012 | Papasakellariou et al. |
| 2013/0148592 A1 | 6/2013 | Noh et al. |
| 2013/0242911 A1* | 9/2013 | Heo .................. H04L 5/001 370/329 |

FOREIGN PATENT DOCUMENTS

| | | |
|---|---|---|
| CN | 102792619 A | 11/2012 |
| EP | 2536050 A2 | 12/2012 |
| EP | 2660992 A1 | 11/2013 |
| EP | 2765732 A2 | 8/2014 |
| WO | 2014075277 A1 | 5/2014 |

* cited by examiner

PERFORMING SELECTIVE SCHEDULING ON UPLINK FREQUENCIES USING SOUNDING REFERENCE SIGNALS (SRS)

CROSS-REFERENCE TO RELATED APPLICATIONS

This application is a continuation of International Patent Application No. PCT/CN2015/090698, filed on Sep. 25, 2015, the disclosure of which is hereby incorporated by reference in its entirety.

TECHNICAL FIELD

The present disclosure is pertinent to the field of communications technologies, and in particular, to data transmission methods, data transmission apparatus, base stations, and user equipment.

BACKGROUND

In an Long Term Evolution (LTE) system, a base station performs selective scheduling on uplink frequencies according to a sounding reference signal (SRS). In a time division duplex-Long Term Evolution (TDD-LTE) system, a base station may further estimate a quality of a downlink channel according to an SRS using reciprocity of uplink and downlink channels, to provide technological support for enabling a massive multiple-input multiple-output (MIMO) technology.

In the LTE system, a Physical Uplink Control Channel (PUCCH) is used to send uplink control information. Formats of the PUCCH are classified into a format 1, a format 1a, a format 1b, a format 2, a format 2a, a format 2b, and a format 3.

In an existing LTE system, during transmission, the PUCCH occupies a plurality of symbols in a subframe. When a format of the PUCCH is the format 1/format 3, the PUCCH and an SRS may be transmitted in a time division multiplexing manner. Specifically, the PUCCH in the format 1/format 3 is configured as a truncated structure, the SRS is transmitted in a last symbol of a subframe, and the PUCCH in the format 1/format 3 is transmitted in other symbols of the subframe. A structure of the subframe is shown in FIG. 1.

During evolution of the LTE system, a new subframe structure is put forward. Channels are differentiated in the time domain, each occupying the entire effective bandwidth. The PUCCH is transmitted in a last symbol of a subframe after the evolution. In such a new LTE system, the PUCCH occupies only the last symbol of the subframe during transmission, and therefore the existing solution in which the PUCCH and the SRS are transmitted in a time division multiplexing manner cannot be applied to the new LTE system. Transmission of a PUCCH and an SRS becomes an urgent problem to be resolved by a person skilled the art.

SUMMARY

In view of this, embodiments of the present disclosure are to provide a data transmission method and a data transmission apparatus applied to a base station and user equipment to transmit a PUCCH and an SRS between the user equipment and the base station when transmission of the PUCCH occupies only a last symbol of a subframe.

Embodiments of the present disclosure provides the following technical solutions.

According to a first aspect, the present disclosure discloses a data transmission apparatus, where the data transmission apparatus includes:

an information configuration unit, configured to determine configuration information of a physical uplink control channel (PUCCH) and configuration information of an uplink sounding reference signal (SRS), where the configuration information of the PUCCH indicates a frequency-domain resource for transmitting the PUCCH, the configuration information of the SRS indicates a frequency-domain resource for transmitting the SRS, where the frequency-domain resource for transmitting the PUCCH is different from the frequency-domain resource for transmitting the SRS but both are in a same subframe, where the PUCCH is mapped to a last symbol of the subframe, and the SRS is mapped to the last symbol of the subframe;

a data sending unit, configured to send the configuration information of the PUCCH and the configuration information of the SRS to a user equipment (UE) in a cell;

a first subcarrier receiving unit, configured to receive, according to the configuration information of the PUCCH, a subcarrier that carries the PUCCH and that is sent by the UE;

a first demodulation unit, configured to demodulate the subcarrier that carries the PUCCH to obtain the PUCCH;

a second subcarrier receiving unit, configured to receive, according to the configuration information of the SRS, a subcarrier that carries the SRS and that is sent by the UE; and a second demodulation unit, configured to demodulate the subcarrier that carries the SRS to obtain the SRS.

According to a second aspect, the present disclosure discloses a base station, including the data transmission apparatus disclosed in the first aspect.

According to a third aspect, the present disclosure discloses a base station, including: a processor, a communications interface, a memory, and a communications bus, where the communications interface is configured to send and receive data; the memory is configured to store a program; and the processor is configured to execute the program to perform the operations of:

determining configuration information of a physical uplink control channel (PUCCH) and configuration information of an uplink sounding reference signal (SRS), where the configuration information of the PUCCH indicates a frequency-domain resource for transmitting the PUCCH, the configuration information of the SRS indicates a frequency-domain resource for transmitting the SRS, where the frequency-domain resource for transmitting the PUCCH is different than the frequency-domain resource for transmitting the SRS but both are in a same subframe, wherein the PUCCH is mapped to a last symbol of the subframe, and the SRS is mapped to the last symbol of the subframe; controlling the communications interface to send the configuration information of the PUCCH and the configuration information of the SRS to a user equipment (UE) in a cell; controlling, according to the configuration information of the PUCCH, the communications interface to receive a subcarrier that carries the PUCCH that is sent by the UE, and demodulating the subcarrier that carries the PUCCH to obtain the PUCCH; and controlling, according to the configuration information of the SRS, the communications interface to receive a subcarrier that carries the SRS that is sent by the UE, and demodulate the subcarrier that carries the SRS to obtain the SRS.

According to a fourth aspect, the present disclosure discloses a data transmission apparatus, the data transmission apparatus includes:

a data receiving unit, configured to receive configuration information of a physical uplink control channel (PUCCH) and configuration information of an uplink sounding reference signal (SRS) that are sent by a base station, where the configuration information of the PUCCH indicates a frequency-domain resource for transmitting the PUCCH, and the configuration information of the SRS indicates a frequency-domain resource for transmitting the SRS;

a first frequency-domain resource determining unit, configured to determine, according to the received configuration information of the PUCCH, the frequency-domain resource for transmitting the PUCCH;

a first modulation unit, configured to transmit the PUCCH using a subcarrier in the frequency-domain resource determined by the first frequency-domain resource determining unit, where the PUCCH is mapped to a last symbol of a subframe;

a second frequency-domain resource determining unit, configured to determine, according to the received configuration information of the SRS, the frequency-domain resource for transmitting the SRS; and a second modulation unit, configured to transmit the SRS using a subcarrier in the frequency-domain resource determined by the second frequency-domain resource determining unit, where the SRS is mapped to the last symbol of the subframe.

According to a fifth aspect, the present disclosure discloses user equipment, including the data transmission apparatus disclosed in the fourth aspect.

According to a sixth aspect, the present disclosure discloses user equipment, including: a processor, a communications interface, a memory, and a communications bus, where the communications interface is configured to send and receive data; the memory is configured to store a program; and the processor is configured to execute the program to perform the operations of:

determining, according to configuration information of a PUCCH that is received by the communications interface, a frequency-domain resource for transmitting the PUCCH; controlling the communications interface to transmit the PUCCH using a subcarrier in the determined frequency-domain resource, where the PUCCH is mapped to a last symbol of a subframe; and determining, according to configuration information of an SRS that is received by the communications interface, a frequency-domain resource for transmitting the SRS, and controlling the communications interface to transmit the SRS using a subcarrier in the determined frequency-domain resource, where the SRS is mapped to the last symbol of the subframe.

According to a seventh aspect, the present disclosure discloses a data transmission method, where the data transmission method includes:

determining configuration information of a physical uplink control channel (PUCCH) and configuration information of an uplink sounding reference signal (SRS), where the configuration information of the PUCCH indicates a frequency-domain resource for transmitting the PUCCH, where the configuration information of the SRS indicates a frequency-domain resource for transmitting the SRS, where the frequency-domain resource for transmitting the PUCCH is different than the frequency-domain resource for transmitting the SRS but both are in a same subframe, where the PUCCH is mapped to a last symbol of the subframe, and the SRS is mapped to the last symbol of the subframe;

sending the configuration information of the PUCCH and the configuration information of the SRS to a user equipment (UE) in a cell;

receiving, according to the configuration information of the PUCCH, a subcarrier that carries the PUCCH and that is sent by the UE, and demodulating the subcarrier that carries the PUCCH to obtain the PUCCH; and receiving, according to the configuration information of the SRS, a subcarrier that carries the SRS and that is sent by the UE, and demodulating the subcarrier that carries the SRS to obtain the SRS.

According to an eighth aspect, the present disclosure discloses a data transmission method, where the data transmission method includes:

receiving configuration information of a physical uplink control channel (PUCCH) and configuration information of an uplink sounding reference signal (SRS) that are sent by a base station, where the configuration information of the PUCCH indicates a frequency-domain resource for transmitting the PUCCH, and the configuration information of the SRS indicates a frequency-domain resource for transmitting the SRS;

determining, according to the received configuration information of the PUCCH, the frequency-domain resource for transmitting the PUCCH, and transmitting the PUCCH using a subcarrier in the determined frequency-domain resource, where the PUCCH is mapped to a last symbol of a subframe; and determining, according to the received configuration information of the SRS, the frequency-domain resource for transmitting the SRS, and transmitting the SRS using a subcarrier in the determined frequency-domain resource, where the SRS is mapped to the last symbol of the subframe.

It can be learned that the beneficial effects of the embodiments of the present disclosure are as follows: According to the data transmission method disclosed in an embodiment of the present disclosure, the base station determines the configuration information of the PUCCH and the configuration information of the SRS. The base station sends the configuration information of the PUCCH and the configuration information of the SRS to an UE in the cell, so that the UE determines, according to the received configuration information of the PUCCH, the frequency-domain resource for transmitting the PUCCH, and determines, according to the received configuration information of the SRS, the frequency-domain resource for transmitting the SRS. In addition, the frequency-domain resource for transmitting the PUCCH can be different than the frequency-domain resource for transmitting the SRS (and/or by different UEs) but are both in a same subframe. The base station receives, according to the configuration information of the PUCCH, the subcarrier that carries the PUCCH sent by the UE, and demodulates the subcarrier to obtain the PUCCH sent by the UE. The base station receives, according to the configuration information of the SRS, the subcarrier that carries the SRS that is sent by the UE, and demodulates the subcarrier to obtain the SRS sent by the UE. Based on embodiments of the data transmission method disclosed in the present disclosure, the PUCCH and the SRS can be multiplexed on a single-symbol structure, so that the PUCCH and the SRS can be transmitted between the UE and the base station improving utilization of frequency-domain resources.

BRIEF DESCRIPTION OF DRAWINGS

To describe the technical solutions in the embodiments of the present disclosure or in the prior art more clearly, the following briefly describes the accompanying drawings required for describing the embodiments or the prior art. Apparently, the accompanying drawings in the following description show merely the embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

An embodiment of the present disclosure discloses a data transmission method applied to a base station, to transmit a PUCCH and an SRS between user equipment and a base station when a transmission of the PUCCH occupies a last symbol of a subframe after evolution.

Figure 1:
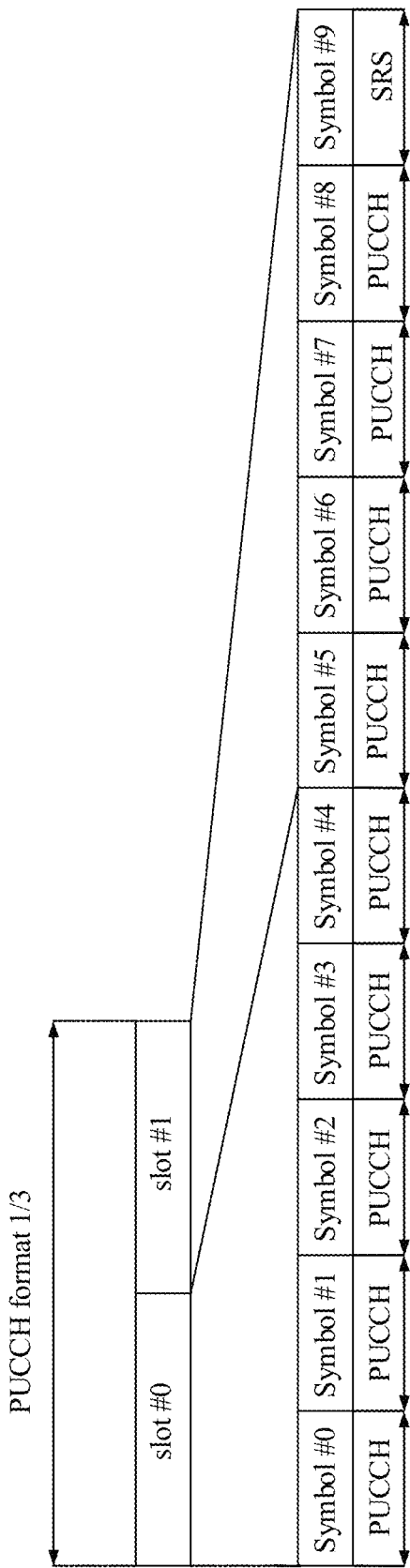
FIG. 1 is a structure of a subframe in an existing LTE system.
Figure 2:
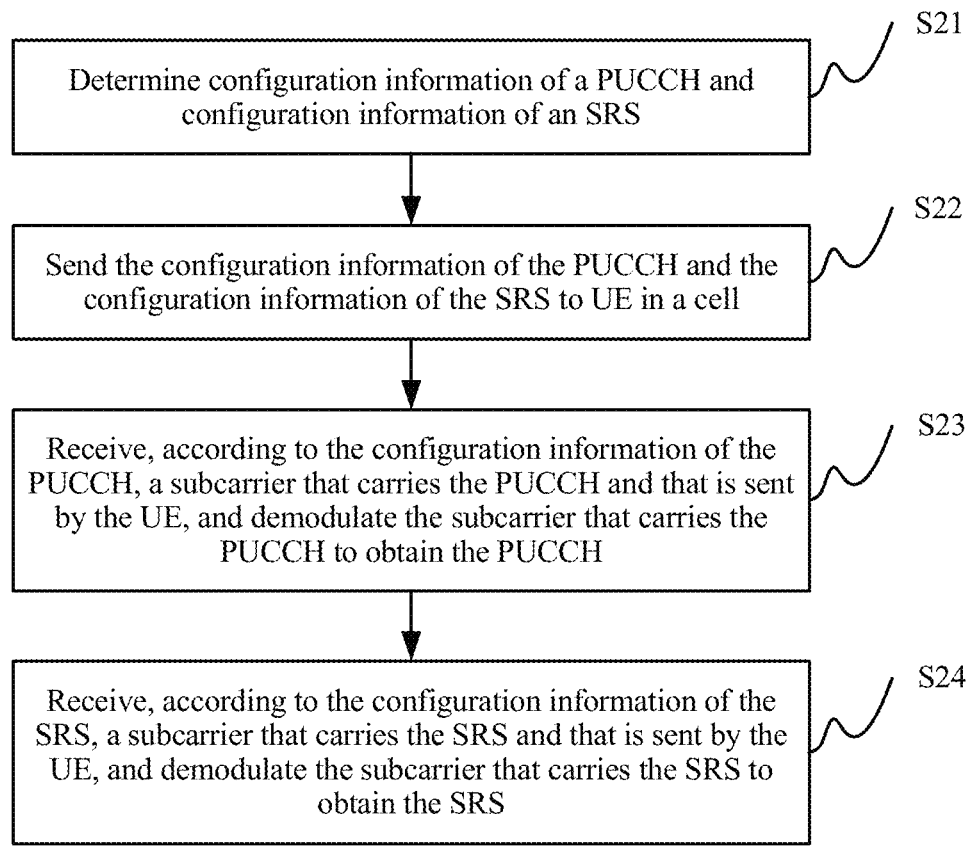
FIG. 2 is a flowchart of a data transmission method applied to a base station according to an embodiment of the present disclosure.

Referring to FIG. 2, FIG. 2 is a flowchart of a data transmission method applied to a base station according to an embodiment of the present disclosure. The data transmission method includes the following operations.

Operation S21: Determine configuration information of a PUCCH and configuration information of an SRS.

The configuration information of the PUCCH indicates a frequency-domain resource for transmitting the PUCCH, the configuration information of the SRS indicates a frequency-domain resource for transmitting the SRS, where the frequency-domain resource for transmitting the PUCCH is different than the frequency-domain resource for transmitting the SRS and both are in a subframe. During transmission, the PUCCH is mapped to a last symbol of the subframe, and the SRS is mapped to the last symbol of the subframe. In an LTE system and an LTE-Advanced system, a subframe is divided into several time lengths in a time domain, and a last time length is the last symbol of the subframe. For example, a subframe is divided into 14 time lengths in the time domain, each time length is 1/14 ms, and a fourteenth time length is a last symbol of the subframe.

It should be noted herein that transmitting the PUCCH includes transmitting uplink control information, and determining the configuration information of the PUCCH includes determining configuration information of the uplink control information.

Operation S22: Send the configuration information of the PUCCH and the configuration information of the SRS to an UE in a cell.

For example, the base station sends the configuration information of the SRS to the UE in the cell using a similar processing manner in the LTE system than the LTE-Advanced system. The base station may send the configuration information of the PUCCH to the UE in the cell in the following manner: by defining the configuration information of the PUCCH as cell-level information, and notifying the UE in the cell of the configuration information of the PUCCH using RRC (Radio Resource Control) signaling.

Operation S23: Receive, according to the configuration information of the PUCCH, a subcarrier that carries the PUCCH and that is sent by the UE, and demodulate the subcarrier that carries the PUCCH to obtain the PUCCH.

Operation S24: Receive, according to the configuration information of the SRS, a subcarrier that carries the SRS which is sent by the UE, and demodulate the subcarrier that carries the SRS to obtain the SRS.

In the LTE system and/or the LTE-Advanced system, a priority for sending the PUCCH is higher than a priority for sending the SRS. Generally, if one UE needs to send a PUCCH and an SRS at the same time, the UE preferably sends the PUCCH. Different UEs in a cell however may send a PUCCH and an SRS to a base station at the same time. For example, at the same time, a first user equipment (UE 1) in the cell can send a PUCCH to the base station, and a second user equipment (UE 2) in the cell can send an SRS to the base station.

When the UE needs to send the PUCCH to the base station, the UE determines, according to the received configuration information of the PUCCH, the frequency-domain resource for transmitting the PUCCH, and transmits the PUCCH using a subcarrier in the frequency-domain resource. When the UE needs to send the SRS to the base station, the UE determines, according to the received configuration information of the SRS, the frequency-domain resource for transmitting the SRS, and transmits the SRS using a subcarrier in the frequency-domain resource. In addition, in a subframe, the frequency-domain resource occupied by one UE in the cell to send the PUCCH to the base station and the frequency-domain resource occupied by another UE in the cell to send the SRS to the base station can be different. The PUCCH can be mapped to a last symbol of the subframe, and the SRS can also be mapped to the last symbol of the subframe.

In one embodiment, the base station receives, according to the configuration information of the PUCCH, the subcarrier that carries the PUCCH that is sent by the UE, and demodulates the subcarrier to obtain the PUCCH sent by the UE. The base station receives, according to the configuration information of the SRS, the subcarrier that carries the SRS that is sent by the UE, and demodulates the subcarrier to obtain the SRS sent by the UE.

According to the data transmission method disclosed in an embodiment of the present disclosure, the base station determines the configuration information of the PUCCH and the configuration information of the SRS, and sends the configuration information of the PUCCH and the configuration information of the SRS to the UE in the cell, so that the UE determines, according to the received configuration information of the PUCCH, the frequency-domain resource for transmitting the PUCCH, and determines, according to the received configuration information of the SRS, the frequency-domain resource for transmitting the SRS. In addition, in a subframe, the frequency-domain resource for transmitting the PUCCH by one UE and the frequency-domain resource for transmitting the SRS by another UE can be different. The base station receives, according to the configuration information of the PUCCH, the subcarrier that carries the PUCCH and that is sent by the UE, and demodulates the subcarrier to obtain the PUCCH sent by the UE. The base station receives, according to the configuration information of the SRS, the subcarrier that carries the SRS and that is sent by the UE, and demodulates the subcarrier to obtain the SRS sent by the UE. Based on the data transmission method disclosed in an embodiment of the present disclosure, the PUCCH and the SRS are multiplexed on a single-symbol structure, so that the PUCCH and the SRS are transmitted between the UE and the base station improving utilization of frequency-domain resources.

In an embodiment, the configuration information of the SRS includes: a minimum frequency hopping period of the SRS, frequency hopping periods of the SRS that are configured in different time offsets, and a frequency bandwidth occupied by the SRS, a frequency domain start location, and a frequency hopping rule in each frequency hopping period of the SRS. The configuration information of the PUCCH includes: a minimum frequency hopping period of the PUCCH, frequency hopping periods of the PUCCH that are configured in different time offsets, and a frequency bandwidth occupied by the PUCCH, a frequency domain start location, and a frequency hopping rule in each frequency hopping period of the PUCCH.

The minimum frequency hopping period of the PUCCH can be the same as the minimum frequency hopping period of the SRS. A frequency hopping period of the PUCCH and a frequency hopping period of the SRS that are configured in a same time offset can be the same. In a similar frequency hopping period, the frequency hopping rule of the PUCCH can be the same as the frequency hopping rule of the SRS, the frequency domain start location of the SRS can be outside the frequency-domain resource of the PUCCH, and an initial frequency-domain resource of the SRS and an initial frequency-domain resource of the PUCCH may not be overlapping.

Figure 3:
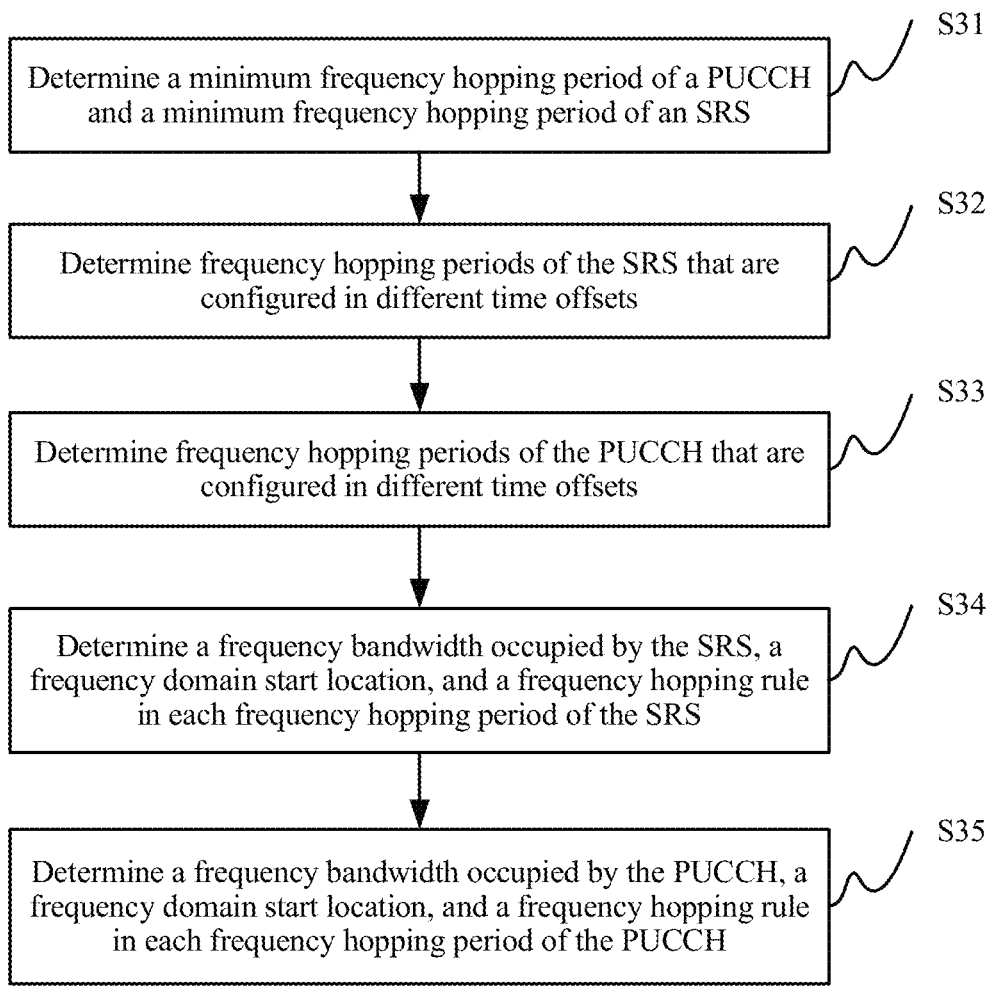
FIG. 3 is a flowchart of a method for a base station to determine configuration information of a PUCCH and configuration information of an SRS according to an embodiment of the present disclosure.

Referring to FIG. 3, in one embodiment, a method for the base station to determine the configuration information of the PUCCH and the configuration information of the SRS includes the following operations.

Operation S31: Determine a minimum frequency hopping period of the PUCCH and a minimum frequency hopping period of the SRS. The minimum frequency hopping period of the PUCCH is approximately the same as the minimum frequency hopping period of the SRS.

In the LTE system and/or the LTE-Advanced system, frequency hopping transmission or non-frequency hopping transmission may be configured for the SRS in a frequency domain, and periodic transmission or aperiodic transmission may be configured for the SRS in a time domain. When periodic transmission is configured for the SRS, a TSRS period may be configured as 2 ms, 5 ms, 10 ms, 20 ms, 40 ms, 80 ms, 160 ms, or 320 ms. A time offset of the SRS in the configurable period is $T'_{offset,cell}$, which is greater than or equal to 0, and is less than TSRS. It should be noted, a time interval between a current time and a start time of the current period is a time offset of the frequency hopping period. For example, an SRS with a minimum frequency hopping period of 2 ms has time offsets in the minimum frequency hopping period as 0 and 1 ms. An SRS with a minimum frequency hopping period of 5 ms has time offsets in the minimum frequency hopping period as 0, 1 ms, 2 ms, 3 ms, and 4 ms.

Operation S32: Determine frequency hopping periods of the SRS that are configured in different time offsets.

Operation S33: Determine frequency hopping periods of the PUCCH that are configured in different time offsets. In one embodiment, a frequency hopping period of the PUCCH and a frequency hopping period of the SRS that are configured in a time offset are the same. That is, in each subframe, a frequency hopping period of the PUCCH is the same as a frequency hopping period of the SRS.

Operation S34: Determine a frequency bandwidth occupied by the SRS, a frequency domain start location, and a frequency hopping rule in each frequency hopping period of the SRS.

Operation S35: Determine a frequency bandwidth occupied by the PUCCH, a frequency domain start location, and a frequency hopping rule in each frequency hopping period of the PUCCH.

In one embodiment, for a frequency hopping period, the frequency hopping rule of the PUCCH is the same as the frequency hopping rule of the SRS, the frequency domain start location of the SRS is outside the frequency-domain resource of the PUCCH, and an initial frequency-domain resource of the SRS and an initial frequency-domain resource of the PUCCH are not overlapping.

For example, for a frequency hopping period, if a frequency domain start location of the PUCCH is f1, a frequency bandwidth is f11, a frequency domain start location of the SRS is f2, and a frequency bandwidth is f12, an initial frequency-domain resource from f2 to (f2+f12) of the SRS and an initial frequency-domain resource from f1 to (f1+f11) of the PUCCH do not overlap. Because the same frequency hopping rule is applied to the PUCCH and the SRS in the same frequency hopping period, a frequency-domain resource for transmitting the PUCCH and a frequency-domain resource for transmitting the SRS in each subframe would not overlap.

Because multiplexing capabilities of the SRS in different frequency hopping periods in a cell are limited, when the minimum frequency hopping period of the SRS is 2 ms, multiplexing and transmission can be performed in subframes of two different time offsets, and a maximum of three frequency hopping periods and three frequency hopping rules can be configured. Specifically, SRSs with frequency hopping periods of 2 ms and 10 ms can be multiplexed in a subframe of a first time offset, and an SRS with another frequency hopping period can be multiplexed in a subframe of a second time offset.

When the minimum frequency hopping period of the PUCCH is 2 ms, multiplexing can be performed in subframes of two different time offsets, and a maximum of three frequency hopping periods and three frequency hopping rules can be configured. Specifically, PUCCHs with frequency hopping periods of 2 ms and 10 ms can be multiplexed in a subframe of a first time offset, and a PUCCH with another frequency hopping period can be multiplexed in a subframe of a second time offset.

Figure 4:
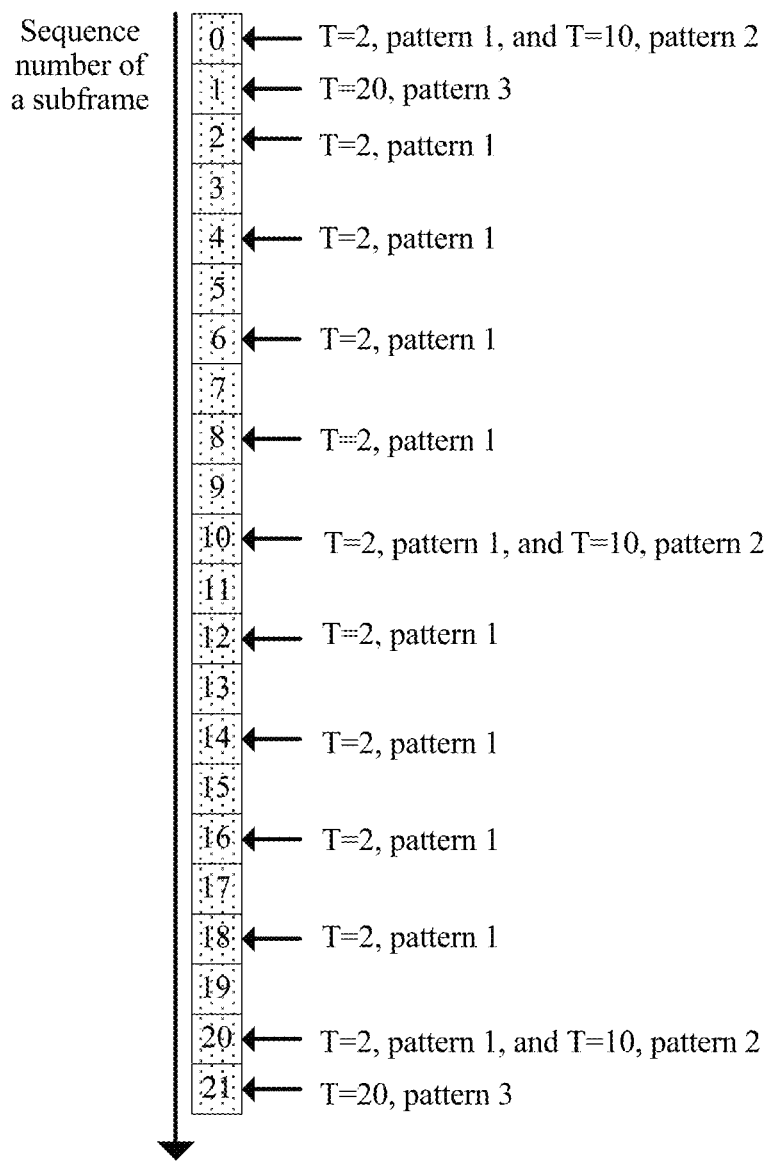
FIG. 4 is a diagram of an example of frequency hopping periods and frequency hopping rules that are configured in subframes of different time offsets for an SRS when a minimum frequency hopping period of the SRS is 2 ms.

FIG. 4 shows an example of frequency hopping periods and frequency hopping rules that are configured in subframes of different time offsets for an SRS when a minimum frequency hopping period of the SRS is 2 ms. Specifically, an SRS with a frequency hopping period of 2 ms or 10 ms is configured in a subframe of a time offset of 0, and an SRS with a frequency hopping period of 20 ms is configured in a subframe of a time offset of 1 ms. A frequency hopping rule applied to the SRS with the frequency hopping period of 2 ms is a pattern 1, a frequency hopping rule applied to the SRS with the frequency hopping period of 10 ms is a pattern 2, and a frequency hopping rule applied to the SRS with the frequency hopping period of 20 ms is a pattern 3.

When the minimum frequency hopping period of the SRS is greater than 2 ms, a quantity of frequency hopping periods and a quantity of frequency hopping rules that can be configured in subframes of different time offsets are a maximum of the minimum frequency hopping period of the SRS. In addition, when the minimum frequency hopping period of the PUCCH is greater than 2 ms, a quantity of frequency hopping periods and a quantity of frequency hopping rules that can be configured in subframes of different time offsets are a maximum of the minimum frequency hopping period of the PUCCH.

Because the configuration information of the PUCCH needs to be delivered as cell-level information, when the minimum frequency hopping period of the SRS is greater than 2 ms, a maximum of five frequency hopping periods and five frequency hopping rules can be configured in subframes of different time offsets, so as to restrict overheads for delivering the cell-level information. Correspondingly, when the minimum frequency hopping period of the PUCCH is greater than 2 ms, a maximum of five frequency hopping periods and five frequency hopping rules can be configured in subframes of different time offsets.

Figure 5:
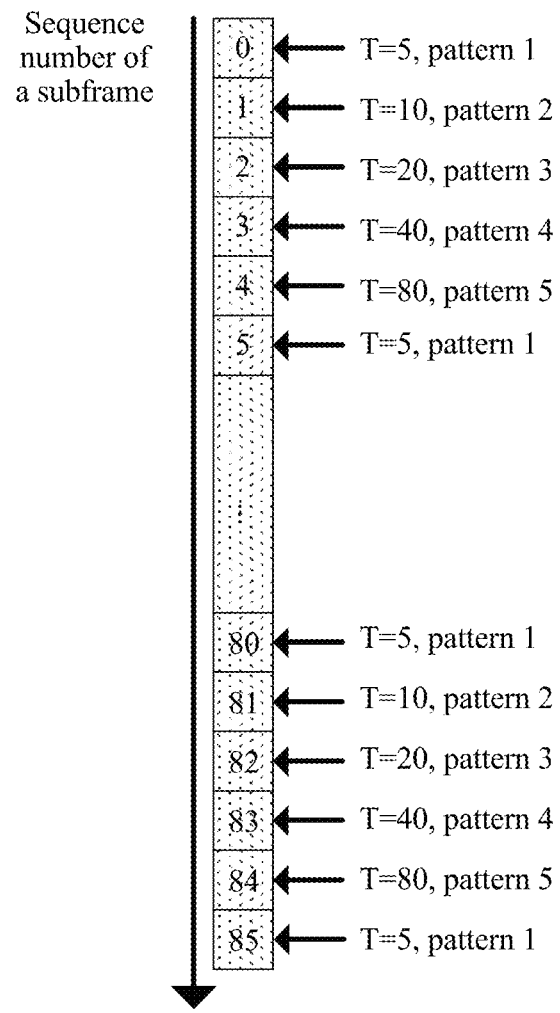
FIG. 5 is a diagram of an example of frequency hopping periods and frequency hopping rules that are configured in subframes of different time offsets for an SRS when a minimum frequency hopping period of the SRS is 5 ms.

FIG. 5 shows an example of frequency hopping periods and frequency hopping rules that are configured in subframes of different time offsets for an SRS when a minimum frequency hopping period of the SRS is 5 ms. Specifically, an SRS with a frequency hopping period of 5 ms is configured in a subframe of a time offset 0, and uses a frequency hopping rule of pattern 1. An SRS with a frequency hopping period of 10 ms is configured in a subframe of a time offset of 1 ms, and uses a frequency hopping rule of pattern 2. An SRS with a frequency hopping period of 20 ms is configured in a subframe of a time offset of 2 ms, and uses a frequency hopping rule of pattern 3. An SRS with a frequency hopping period of 40 ms is configured in a subframe of a time offset of 3 ms, and uses a frequency hopping rule of pattern 4. An SRS with a frequency hopping period of 80 ms is configured in a subframe of a time offset of 4 ms, and uses a frequency hopping rule of pattern 5.

In the LTE system and/or the LTE-Advanced system, when transmission in a frequency hopping mode is configured for the SRS, after a width of a frequency band at which the UE transmits the SRS and a frequency domain start location are determined, a frequency hopping rule for the UE to transmit the SRS may be determined. In addition, a minimum transmission bandwidth at which the UE transmits the SRS is a bandwidth corresponding to four resource groups, and a width of a frequency band at which the UE transmits the PUCCH is configured as a bandwidth corresponding to n×4 resource groups. Each resource group is corresponding to 12 continuous subcarriers in a frequency domain, and one symbol resource in a time domain. When a bandwidth of a subcarrier is 15 kHz, a bandwidth of one resource group can be 180 kHz. In addition, a value of n meets setting of a hierarchical structure of an SRS bandwidth in the LTE system and/or the LTE-Advanced system, that is, $n \in \{N_3, N_3 \times N_2, N_3 \times N_2 \times N_1\}$, where $N_1$, $N_2$, and $N_3$ are values in an LTE protocol. In one embodiment, the value of n is 1, that is, the frequency bandwidth occupied by the PUCCH is a bandwidth corresponding to four resource groups.

The frequency hopping period of the SRS and the frequency hopping period of the PUCCH configured in the same time offset can be the same, and both can be in the same frequency hopping period. The frequency hopping rule of the SRS can be the same as the frequency hopping rule of the PUCCH. In addition, the frequency domain start location of the SRS may be restricted by the frequency domain start location of the PUCCH, and code division multiplexing cannot be performed on the PUCCH and the SRS in a same frequency-domain resource. Therefore, after the frequency domain start location of the PUCCH is determined, during selection of the frequency domain start location of the SRS, the frequency-domain resource occupied by the PUCCH needs to be excluded, that is, the frequency domain start location of the SRS is outside the frequency-domain resource of the PUCCH, and the initial frequency-domain resource of the SRS and the initial frequency-domain resource of the PUCCH are not overlapping.

According to the method shown in FIG. 3, in one embodiment, the configuration information of the PUCCH and the configuration information of the SRS are determined, and the frequency-domain resources for transmitting the PUCCH and the SRS are dynamically allocated. In addition, the minimum frequency hopping period of the PUCCH is the same as the minimum frequency hopping period of the SRS, the frequency hopping period of the SRS and the frequency hopping period of the PUCCH that are configured for a time offset are the same, and in the same frequency hopping period. The frequency hopping rule of the SRS is the same as the frequency hopping rule of the PUCCH. Because the frequency domain start location of the PUCCH and the frequency domain start location of the SRS in the same frequency hopping period are different, and the initial frequency-domain resource of the SRS and the initial frequency-domain resource of the PUCCH are not overlapping, no conflict would occur between the frequency-domain resources that are used by different UEs to transmit the PUCCH and the SRS in the same subframe.

For example, because the UE in the cell does not need to transmit the SRS in all subframes, but the UE still needs to transmit the PUCCH in these subframes, frequency-domain resources occupied when the UE transmits the PUCCH in these subframes are required to be determined. Based on the method shown in FIG. 3, in one embodiment, a process for determining the configuration information of the PUCCH further includes: configuring a fixed frequency-domain resource of the PUCCH, where the fixed frequency-domain resource of the PUCCH includes a frequency bandwidth occupied by the PUCCH and a frequency domain start location. That is, the base station allocates, in a dynamic indication with semi-static configuration manner, the frequency-domain resource for transmitting the PUCCH.

FIG. 4 illustrates an example of the above. Referring to FIG. 4, an UE does not need to transmit the SRS in subframes with sequence numbers 3, 5, 7, 9, 11, 13, . . . , but the UE still needs to transmit the PUCCH in these subframes. When the UE needs to transmit the PUCCH to the base station in the subframes, the UE uses the fixed frequency-domain resource of the PUCCH for transmission.

In one embodiment, the base station receiving, according to the configuration information of the PUCCH, a subcarrier that carries the PUCCH that is sent by the UE includes: determining, by the base station according to the configuration information of the PUCCH, a frequency-domain resource occupied by the subcarrier that carries the PUCCH in a current subframe; and receiving the subcarrier in the frequency-domain resource.

Figure 6:
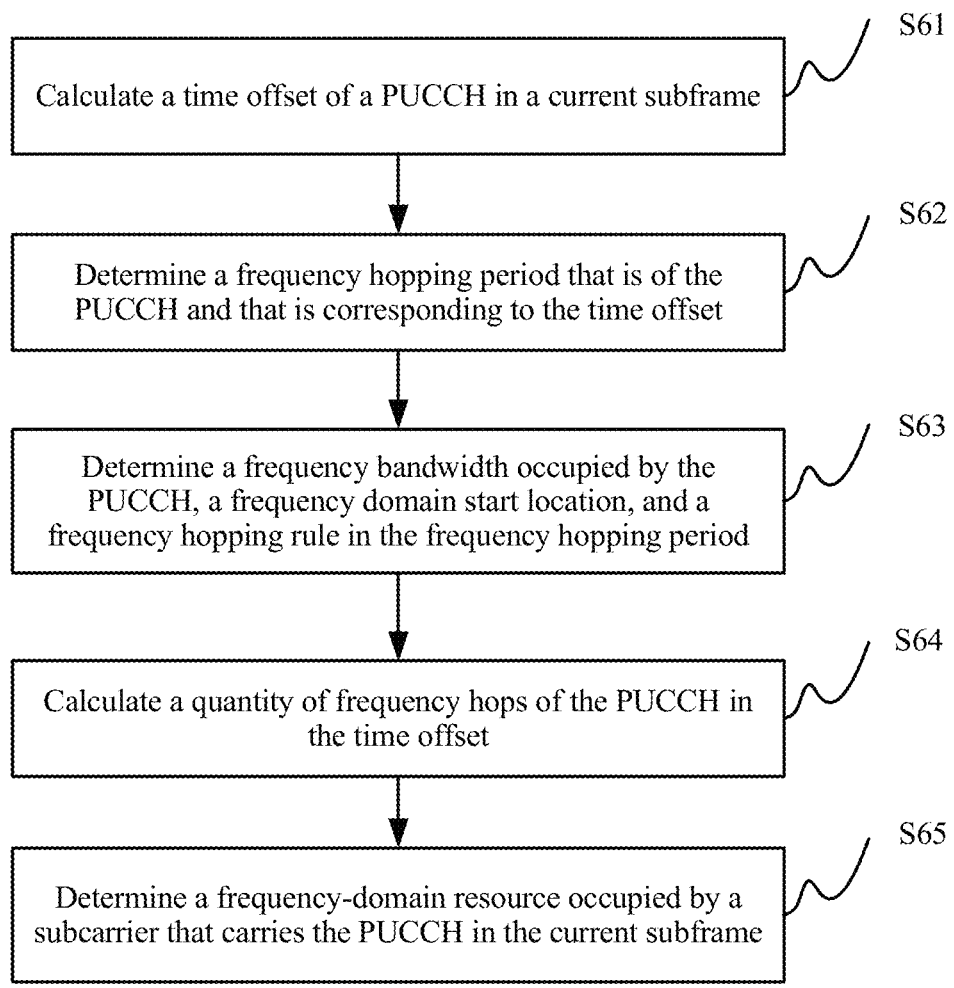
FIG. 6 is a flowchart of a method for a base station to determine a frequency-domain resource occupied by a subcarrier that carries a PUCCH in a current subframe according to an embodiment of the present disclosure.

When the base station dynamically configures the frequency-domain resource of the PUCCH, the base station can determine, according to the configuration information of the PUCCH in a manner shown in FIG. 6, the frequency-domain resource occupied by the subcarrier that carries the PUCCH in the current subframe. The manner includes the following operations.

Operation S61: Calculate a time offset $T_{offset,cell}$ of the PUCCH in the current subframe according to a sequence number N of the subframe and the minimum frequency hopping period $T_{PUCCH,cell}$ of the PUCCH, where $T_{offset,cell} = N \bmod T_{PUCCH,cell}$.

It should be noted herein that the sequence number of the subframe in the present disclosure is different from a conventional subframe number (0 to 9), and the sequence number of the subframe in the present disclosure is a representation form of a system time in the cell. That is, the system time in the cell is measured in a minimum unit of subframe (e.g., 1 ms).

In one embodiment, the sequence number N of the subframe may be represented as follows: $N = n' \times 10240 + n_f \times 10 + n_s$, where $n_s \in \{0, 1, 2, 3, 4, 5, 6, 7, 8, 9\}$, and represents a subframe number; $n_f \in \{0, 1, 2, \ldots, 1022, 1023\}$, and represents a radio frame number; and n' is used to calculate a quantity of flips of $n_f$, and a value of n' depends on a capability and a service requirement of UE.

Operation S62: Determine a frequency hopping period $T_{PUCCH}$ that is of the PUCCH corresponding to the time offset $T_{offset,cell}$ in the current subframe.

Operation S63: Determine a frequency bandwidth occupied by the PUCCH, a frequency domain start location, and a frequency hopping rule in the frequency hopping period $T_{PUCCH}$.

The configuration information, determined by the base station, of the PUCCH includes the frequency hopping periods of the PUCCH corresponding to different time offsets, and the frequency bandwidth occupied by the PUCCH, the frequency domain start location, and the frequency hopping rule in each frequency hopping period. After the time offset $T_{offset,cell}$ is determined by performing operation S61, the frequency hopping period $T_{PUCCH}$ of the PUCCH corresponding to the time offset $T_{offset,cell}$, the frequency bandwidth occupied by the PUCCH, the frequency domain start location, and the frequency hopping rule may be determined.

It should be noted herein that a 2-ms frequency hopping period of the PUCCH and a 10-ms frequency hopping period of the PUCCH may coexist in a same time offset, that is, in the configuration information of the PUCCH, a frequency hopping period of the PUCCH corresponding to the time offset may be 2 ms and 10 ms.

If in the configuration information of the PUCCH, a frequency hopping period that is of the PUCCH corresponding to a time offset includes 2 ms and 10 ms, because the 10-ms frequency hopping period of the PUCCH may not exist in all subframes corresponding to the time offset, it needs to be further determined whether the frequency hopping period of the PUCCH corresponding to the time offset in the current subframe includes 10 ms.

Specifically, $(N - T_{offset,cell})/T_{PUCCH,cell}$ is calculated. If the ratio is a multiple of 5, it is determined that the frequency hopping period of the PUCCH corresponding to the time offset in the current subframe includes 2 ms and 10 ms. If the ratio is not a multiple of 5, it is determined that the frequency hopping period of the PUCCH corresponding to the time offset in the current subframe includes only 2 ms.

Operation S64: Calculate a quantity $N_{PUCCH}$ of frequency hops of the PUCCH in the time offset $T_{offset,cell}$, where $N_{PUCCH} = \lfloor N/T_{PUCCH} \rfloor$. That is, the quantity $N_{PUCCH}$ of frequency hops is a value obtained by rounding down a ratio of the sequence number N of the current subframe to the frequency hopping period $T_{PUCCH}$ of the PUCCH.

Operation S65: Determine, according to the frequency bandwidth occupied by the PUCCH, the frequency domain start location, the frequency hopping rule of the PUCCH in the frequency hopping period $T_{PUCCH}$, the quantity $N_{PUCCH}$ of frequency hops, and the frequency-domain resource occupied by the subcarrier that carries the PUCCH in the current subframe.

When the frequency hopping rule of the PUCCH, the frequency bandwidth occupied by the PUCCH, and the frequency domain start location have been determined, the frequency-domain resource occupied by the subcarrier that carries the PUCCH in the current subframe may be determined according to the quantity $N_{PUCCH}$ of frequency hops.

In one embodiment, when the base station is determining the frequency-domain resource occupied by the subcarrier that carries the PUCCH in the current subframe, after the time offset $T_{offset,cell}$ of the PUCCH in the current subframe is calculated, if it is determined that no corresponding frequency-domain resource is configured for the time offset $T_{offset,cell}$, the base station determines that the frequency-domain resource occupied by the received subcarrier that carries the PUCCH in the subframe to be a preconfigured fixed frequency-domain resource of the PUCCH.

In one embodiment, the base station receiving, according to the configuration information of the SRS, a subcarrier that carries the SRS sent by the UE includes: determining, according to the configuration information of the SRS, a target frequency-domain resource occupied by the subcarrier that carries the SRS in a current subframe; determining, based on the target frequency-domain resource, a frequency-domain resource occupied by the subcarrier that carries the SRS in the current subframe; and receiving the subcarrier in the frequency-domain resource.

Figure 7:
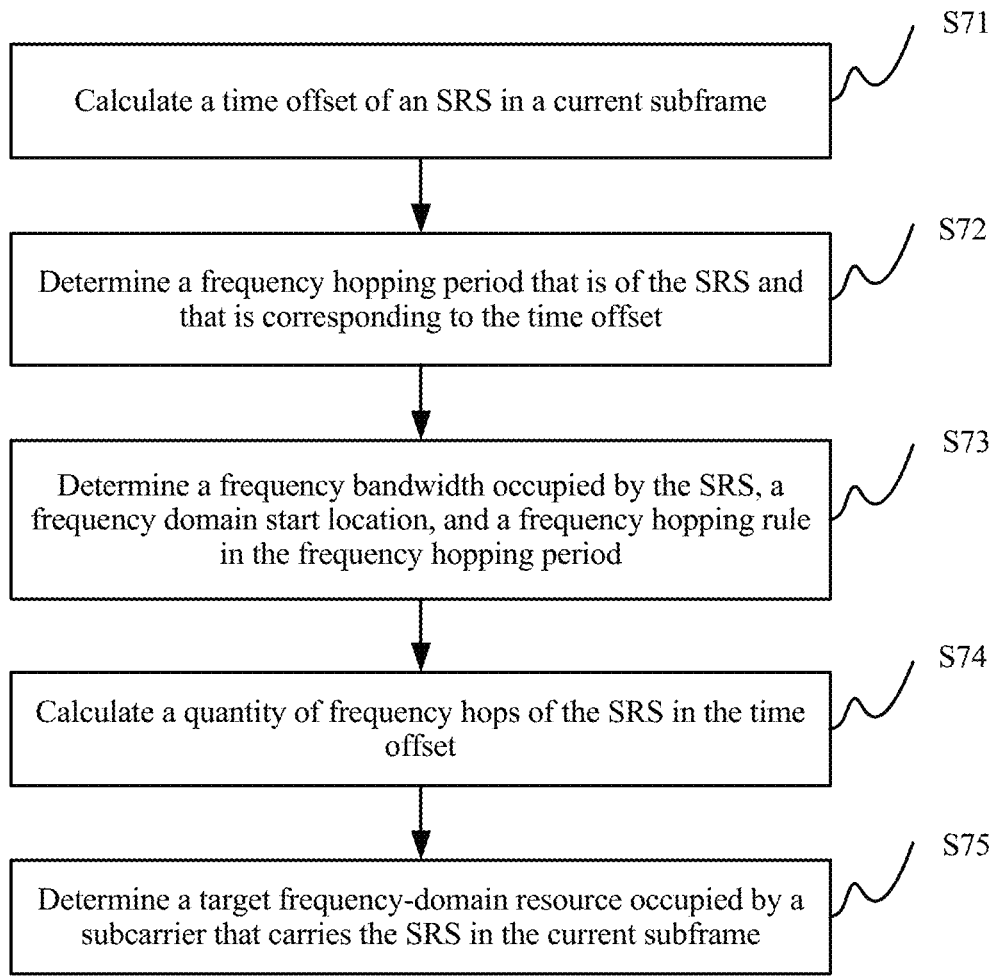
FIG. 7 is a flowchart of a method for a base station to determine a target frequency-domain resource occupied by a subcarrier that carries an SRS in a current subframe according to an embodiment of the present disclosure.

The base station determines, according to the configuration information of the SRS in the manner shown in FIG. 7, the target frequency-domain resource occupied by the subcarrier that carries the SRS in the current subframe. The manner includes the following operations.

Operation S71: Calculate a time $T'_{offset,cell}$ of the SRS in the current subframe according to a sequence number N of the subframe and the minimum frequency hopping period $T_{SRS,cell}$ of the SRS, where $T'_{offset,cell} = N \bmod T_{SRS,cell}$.

Operation S72: Determine a frequency hopping period $T_{SRS}$ of the SRS corresponding to the time offset $T'_{offset,cell}$ in the current subframe.

Operation S73: Determine a frequency bandwidth occupied by the SRS, a frequency domain start location, and a frequency hopping rule in the frequency hopping period $T_{SRS}$.

The configuration information of the SRS includes frequency hopping periods of the SRS that are corresponding to different time offsets, and the frequency bandwidth occupied by the SRS, the frequency domain start location, and the frequency hopping rule in each frequency hopping period. After the time offset $T'_{offset,cell}$ is determined by performing operation S71, the frequency hopping period $T_{SRS}$ of the SRS corresponding to the time offset $T'_{offset,cell}$, the frequency bandwidth occupied by the SRS, the frequency domain start location, and the frequency hopping rule may be determined.

It should be noted herein that a 2-ms frequency hopping period of the SRS and a 10-ms frequency hopping period of the SRS may coexist in the same time offset, that is, in the configuration information of the SRS, a frequency hopping period of the SRS corresponding to the time offset may be 2 ms and 10 ms.

If in the configuration information of the SRS, a frequency hopping period of the SRS corresponding to a time offset includes 2 ms and 10 ms, because the 10-ms frequency hopping period of the SRS may not exist in all subframes corresponding to the time offset, it needs to be further determined whether the frequency hopping period of the SRS corresponding to the time offset in the current subframe includes 10 ms.

Specifically, $(N-T'_{offset,cell})/T_{SRS,cell}$ is calculated. If the ratio is a multiple of 5, it is determined that the frequency hopping period of the SRS corresponding to the time offset, in the current subframe, includes 2 ms and 10 ms. If the ratio is not a multiple of 5, it is determined that the frequency hopping period of the SRS corresponding to the time offset in the current subframe includes only 2 ms.

Operation S74: Calculate a quantity $N_{SRS}$ of frequency hops of the SRS in the time offset $T'_{offset,cell}$, where $N_{SRS} = \lfloor N/T_{SRS} \rfloor$.

Operation S75: Determine, according to the frequency bandwidth occupied by the SRS, the frequency domain start location, and the frequency hopping rule of the SRS in the frequency hopping period $T_{SRS}$, and the quantity $N_{SRS}$ of frequency hops, the target frequency-domain resource occupied by the subcarrier that carries the SRS in the current subframe.

When the frequency hopping rule of the SRS, the frequency bandwidth occupied by the SRS, and the frequency domain start location have been determined, the frequency-domain resource occupied by the subcarrier that carries the SRS in the current subframe may be determined according to only the quantity $N_{SRS}$ of frequency hops.

In some embodiments, a plurality of manners of determining, based on the target frequency-domain resource of the SRS, the frequency-domain resource occupied by the subcarrier that carries the SRS in the current subframe are disclosed. Separate descriptions for the different manners are provided in the following.

In one embodiment, when the target frequency-domain resource is not located on an edge area of an SRS resource pool, the target frequency-domain resource is used as the frequency-domain resource occupied by the subcarrier that carries the SRS.

Correspondingly, demodulating the subcarrier that carries the SRS to obtain the SRS includes: demodulating, using a pre-stored ZC (Zadoff-Chu, e.g., a basic demodulation reference signal) sequence, the subcarrier that carries the SRS to obtain the SRS. The base station performs cyclic shift on a root sequence to form a ZC sequence, and stores the AC sequence. The base station sends the root sequence or an identifier of the root sequence to the UE. After obtaining the root sequence, the UE performs cyclic shift on the root sequence to form the ZC sequence, and stores the ZC sequence.

In the LTE system and/or the LTE-Advanced system, the SRS resource pool may not be able to cover entire frequency-domain resources in a communications system. For example, when a bandwidth of the communications system is 20 MHz (including 100 RBs, where an RB is a resource block), the SRS resource pool can cover a maximum bandwidth of 96 RBs, and two RBs on either end of the frequency-domain resources in the communications system are not covered by the SRS resource pool.

The edge area of the SRS resource pool is an area corresponding to a bandwidth in the SRS resource pool, where a frequency difference between the bandwidth and a minimum frequency of the SRS resource pool is not greater than a RBs, and an area corresponding to a bandwidth in the SRS resource pool, where a frequency difference between the bandwidth and a maximum frequency of the SRS resource pool is not greater than 'a' RBs, where 'a' maybe but is not limited to 2. For example, the bandwidth of the communications system is 20 MHz, and may be divided into 100 RBs: an RB 0 to an RB 99, and the SRS resource pool includes 96 RBs: an RB 2 to an RB 97. In an embodiment, the RB 2, an RB 3, an RB 96, and the RB 97 in the SRS resource pool are defined as the edge area of the SRS resource pool.

In one embodiment, when the target frequency-domain resource is located on an edge area of an SRS resource pool, the target frequency-domain resource of the SRS and a to-be-bundled frequency-domain resource are determined as the frequency-domain resource occupied by the subcarrier that carries the SRS. The to-be-bundled frequency-domain resource is a frequency-domain resource, as part of frequency-domain resources in a communications system, not covered by the SRS resource pool and adjacent to the target frequency-domain resource.

The demodulating the subcarrier that carries the SRS to obtain the SRS includes: extending a pre-stored ZC sequence, and demodulating, using the extended ZC sequence, the subcarrier in a to-be-processed frequency-domain resource, to obtain the SRS.

A length of the extended ZC sequence is (n+m1)×6, where n is a quantity of resource groups included in the target frequency-domain resource of the SRS, and m1 is a quantity of resource groups included in the to-be-bundled frequency-domain resource. In one embodiment, cyclic shift is performed on the pre-stored ZC sequence to obtain the extended ZC sequence. For example, for a pre-stored 12-bit ZC sequence, if the ZC sequence needs to be extended to 14 bits, first two bits of the 12-bit ZC sequence are cyclically added to the end of the ZC sequence, and a length of the extended ZC sequence is 14 bits.

In a process in which the base station receives the subcarrier that carries the SRS, when the target frequency-domain resource of the SRS in the current subframe is located on the edge area of the SRS resource pool, the target frequency-domain resource and an adjacent area that is in the frequency-domain resources in the communications system not covered by the SRS resource pool are bundled and received, so that the UE can transmit the SRS on an entire bandwidth, thereby enhancing an estimation of channel quality by the base station.

Figure 8:
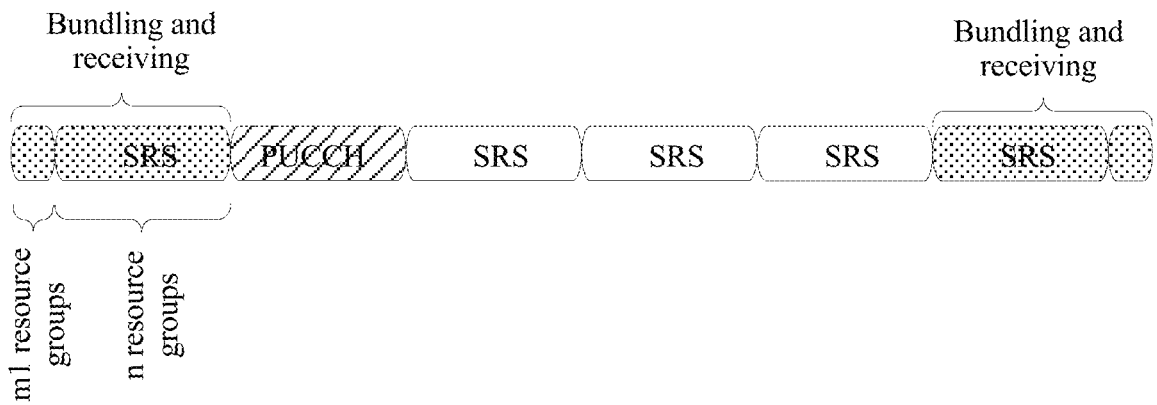
FIG. 8 is a diagram of an example in which a base station bundles and receives a target frequency-domain resource of an SRS and an adjacent frequency-domain resource that is in frequency-domain resources in a communications system and that is not covered by an SRS resource pool.

FIG. 8 shows an example in which the base station bundles and receives the target frequency-domain resource of the SRS and the adjacent frequency-domain resource in the frequency-domain resources in the communications system not covered by the SRS resource pool.

In one embodiment, the configuration information of the SRS includes: a minimum frequency hopping period of the SRS in a cell, frequency hopping periods of the SRS that are configured in different time offsets, a frequency bandwidth occupied by the SRS, a frequency domain start location, and a frequency hopping rule in each frequency hopping period of the SRS. The configuration information of the PUCCH includes: a fixed frequency-domain resource of the PUCCH, where the fixed frequency-domain resource of the PUCCH includes a frequency bandwidth occupied by the PUCCH and a frequency domain start location.

That is, the base station dynamically allocates the frequency-domain resource to the UE to transmit the SRS, and the UE in the cell transmits the PUCCH on the fixed frequency-domain resource. In one embodiment, the fixed frequency-domain resource configured for the PUCCH is located on a non-edge area of an SRS resource pool, so that the UE can bundle an edge area of the SRS resource pool and a frequency-domain resource that is in a communications system not covered by the SRS resource pool to transmit the SRS.

In one embodiment, the base station receiving a subcarrier that carries the SRS sent by the UE includes: determining, according to the configuration information of the SRS, a target frequency-domain resource occupied by the subcarrier that carries the SRS in a current subframe; determining, based on the target frequency-domain resource, a frequency-domain resource occupied by the subcarrier that carries the SRS in the current subframe; and receiving the subcarrier in the frequency-domain resource. Refer to the foregoing description for a manner in which the base station determines, according to the configuration information of the SRS, the target frequency-domain resource occupied by the subcarrier that carries the SRS in the current subframe.

Because the UE transmits the SRS to the base station in a frequency hopping manner, and transmits the PUCCH to the base station using the fixed frequency-domain resource, a conflict may occur between frequency-domain resources when different UEs in the cell transmit the SRS and the PUCCH to the base station. A process in which the base station determines, based on the target frequency-domain resource of the SRS, the frequency-domain resource occupied by the subcarrier that carries the SRS in the current subframe, and a process in which the base station demodulates the subcarrier that carries the SRS is described.

In one embodiment, when the target frequency-domain resource of the SRS and the frequency-domain resource of the PUCCH are not overlapping, and the target frequency-domain resource is located on a non-edge area of the SRS resource pool, the target frequency-domain resource of the STS is determined as the frequency-domain resource occupied by the subcarrier that carries the SRS.

In one embodiment, demodulating the subcarrier that carries the SRS to obtain the SRS includes: demodulating, using a pre-stored ZC sequence, the subcarrier that carries the SRS to obtain the SRS.

In another embodiment, when the target frequency-domain resource of the SRS and the frequency-domain resource of the PUCCH are not overlapping, and the target frequency-domain resource is located on an edge area of the SRS resource pool, the target frequency-domain resource and a to-be-bundled frequency-domain resource are determined as the frequency-domain resource occupied by the subcarrier that carries the SRS. The to-be-bundled frequency-domain resource is a frequency-domain resource, in frequency-domain resources in a communications system, that is not covered by the SRS resource pool and that is adjacent to the target frequency-domain resource.

In one embodiment, demodulating the subcarrier that carries the SRS to obtain the SRS includes: extending a pre-stored ZC sequence, and demodulating, using the extended ZC sequence, the subcarrier that carries the SRS to obtain the SRS. A length of the extended ZC sequence is (n+m1)×6, where n is a quantity of resource groups included in the target frequency-domain resource, and m1 is a quantity of resource groups included in the to-be-bundled frequency-domain resource.

In another embodiment, when there is an overlapping area between the target frequency-domain resource of the SRS and the frequency-domain resource of the PUCCH, and frequency-domain resources that are in the target frequency-domain resource and that are not overlapping with the frequency-domain resource of the PUCCH are continuous frequency-domain resources, the frequency-domain resources that are in the target frequency-domain resource and that are not overlapping with the frequency-domain resource of the PUCCH are determined as the frequency-domain resource occupied by the subcarrier that carries the SRS.

In one embodiment, demodulating the subcarrier that carries the SRS to obtain the SRS includes: compressing a pre-stored ZC sequence, and demodulating, using the compressed ZC sequence, the subcarrier that carries the SRS to obtain the SRS. A length of the compressed ZC sequence is (n−m2)×6, where n is a quantity of resource groups included in the target frequency-domain resource, and m2 is a quantity of resource groups included in the overlapping area between the target frequency-domain resource and the frequency-domain resource of the PUCCH.

Figure 9:
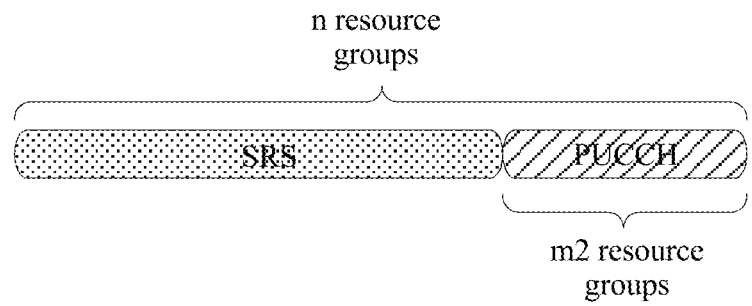
FIG. 9 is a schematic diagram of a state of a conflict between a target frequency-domain resource of an SRS and a frequency-domain resource of a PUCCH.

As shown in FIG. 9, in one embodiment, the target frequency-domain resource of the SRS includes n resource groups, and there is an overlapping area between the target frequency-domain resource of the SRS and the frequency-domain resource of the PUCCH. The overlapping area includes m2 resource groups, and the frequency-domain resources that are in the target frequency-domain resource of the SRS not overlapping with the frequency-domain resource of the PUCCH and are continuous frequency-domain resources. That is, the frequency-domain resource of the PUCCH is located on an edge of the target frequency-domain resource of the SRS.

In this case, the base station determines the frequency-domain resources (including (n−m2) resource groups) that are in the target frequency-domain resource and that are not overlapping with the frequency-domain resource of the PUCCH as the frequency-domain resource occupied by the subcarrier that carries the SRS, compresses a pre-stored ZC sequence, and demodulates, using the compressed ZC sequence, the subcarrier that carries the SRS to obtain the SRS sent by the UE.

In one embodiment, when there is an overlapping area between the target frequency-domain resource of the SRS and the frequency-domain resource of the PUCCH, and the frequency-domain resource of the PUCCH separates the target frequency-domain resource into a first frequency-domain resource and a second frequency-domain resource, one or more of the first frequency-domain resource and the second frequency-domain resource are determined, according to a preset rule, to be the frequency-domain resource occupied by the subcarrier that carries the SRS.

In one embodiment, demodulating the subcarrier that carries the SRS to obtain the SRS includes: compressing a pre-stored ZC sequence, and demodulating, using the compressed ZC sequence, the subcarrier that carries the SRS to obtain the SRS. A length of the compressed ZC sequence is n1×6, where n1 is a quantity of resource groups included in the frequency-domain resource occupied by the subcarrier that carries the SRS.

Figure 10:
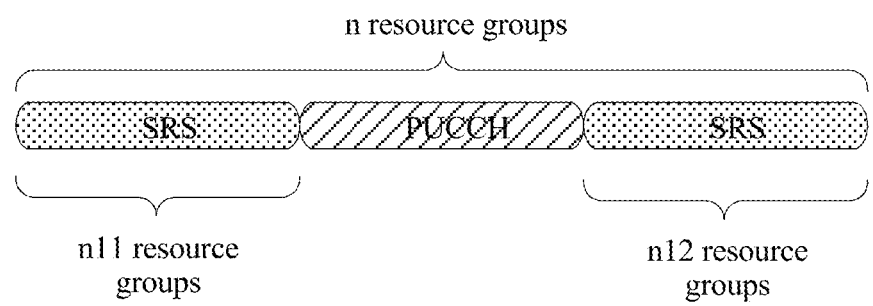
FIG. 10 is another schematic diagram of a state of a conflict between a target frequency-domain resource of an SRS and a frequency-domain resource of a PUCCH.

As shown in FIG. 10, in one embodiment, the target frequency-domain resource of the SRS includes n resource groups, and there is an overlapping area between the target frequency-domain resource of the SRS and the frequency-domain resource of the PUCCH. The overlapping area is located in a middle part of the target frequency-domain resource of the SRS, and the frequency-domain resource of the PUCCH separates the target frequency-domain resource of the SRS into two continuous frequency-domain resources, which are respectively denoted as a first frequency-domain resource and a second frequency-domain resource.

In this case, the UE performs a sending operation according to a preset rule, and the base station performs a receiving operation according to the preset rule.

In one embodiment, UE transmits the SRS using the first frequency-domain resource. Correspondingly, the base station determines the first frequency-domain resource as the frequency-domain resource occupied by the subcarrier that carries the SRS, and receives the subcarrier in the first frequency-domain resource. The base station compresses a pre-stored ZC sequence, and demodulates, using the compressed ZC sequence, the subcarrier in the first frequency-domain resource to obtain the SRS sent by the UE. A length of the compressed ZC sequence is n11×6, where n11 is a quantity of resource groups included in the first frequency-domain resource.

In one embodiment, the UE transmits the SRS using the second frequency-domain resource. Correspondingly, the base station determines the second frequency-domain resource as the frequency-domain resource occupied by the subcarrier that carries the SRS, and receives the subcarrier in the second frequency-domain resource. The base station compresses a pre-stored ZC sequence, and demodulates, using the compressed ZC sequence, the subcarrier in the second frequency-domain resource to obtain the SRS sent by the UE. A length of the compressed ZC sequence is n12×6, where n12 is a quantity of resource groups included in the second frequency-domain resource.

In one embodiment, the UE transmits the SRS using the first frequency-domain resource and the second frequency-domain resource. Correspondingly, the base station determines the first frequency-domain resource and the second frequency-domain resource as the frequency-domain resource occupied by the subcarrier that carries the SRS, and receives subcarriers in the first frequency-domain resource and the frequency-domain resource. The base station compresses a pre-stored ZC sequence, and demodulates, using the compressed ZC sequence, the subcarriers in the first frequency-domain resource and the second frequency-domain resource to obtain the SRS sent by the UE. A length of the compressed ZC sequence is (n11+m12)×6, where n is a quantity of resource groups included in the first frequency-domain resource, and n12 is a quantity of resource groups included in the second frequency-domain resource.

In one embodiment, in a process in which the UE sends the SRS, if it is determined that there is a conflict between a frequency-domain resource for transmitting the SRS and a frequency-domain resource for transmitting the PUCCH in the current subframe, the UE transmits a part of the SRS in the foregoing manners using a frequency-domain resource that is not overlapping, and quits sending an SRS located on an overlapping frequency-domain resource. Then in a process in which the UE sends the PUCCH using the fixed frequency-domain resource, the SRS located on the overlapping frequency-domain resource is also sent.

Specifically, the UE transmits the PUCCH using a first-sequence subcarrier in the fixed frequency-domain resource of the PUCCH, and transmits the SRS using a second-sequence subcarrier in the fixed frequency-domain resource of the PUCCH. The first-sequence subcarrier is an odd-number sequence subcarrier in the fixed frequency-domain resource of the PUCCH, and the second-sequence subcarrier is an even-number sequence subcarrier in the fixed frequency-domain resource of the PUCCH, or the first-sequence subcarrier is an even-number sequence subcarrier in the fixed frequency-domain resource of the PUCCH, and the second-sequence subcarrier is an odd-number sequence subcarrier in the fixed frequency-domain resource of the PUCCH.

In one embodiment, receiving, according to the configuration information of the PUCCH, a subcarrier that carries the PUCCH and that is sent by the UE includes: receiving subcarriers in the fixed frequency-domain resource of the PUCCH.

In one embodiment, demodulating the subcarrier that carries the PUCCH to obtain the PUCCH includes:

when it is determined that the received subcarriers sent by the UE carry only the PUCCH, demodulating the subcarriers in the fixed frequency-domain resource of the PUCCH to obtain the PUCCH; and when it is determined that the received subcarriers sent by the same UE carry both the PUCCH and the SRS, demodulating a first-sequence subcarrier in the fixed frequency-domain resource to obtain the PUCCH, and demodulating a second-sequence subcarrier in the fixed frequency-domain resource to obtain the SRS.

In one embodiment, the first-sequence subcarrier is an odd-number sequence subcarrier in the fixed frequency-domain resource, and the second-sequence subcarrier is an even-number sequence subcarrier in the fixed frequency-domain resource, or the first-sequence subcarrier is an even-number sequence subcarrier in the fixed frequency-domain resource, and the second-sequence subcarrier is an odd-number sequence subcarrier in the fixed frequency-domain resource.

Figure 11:
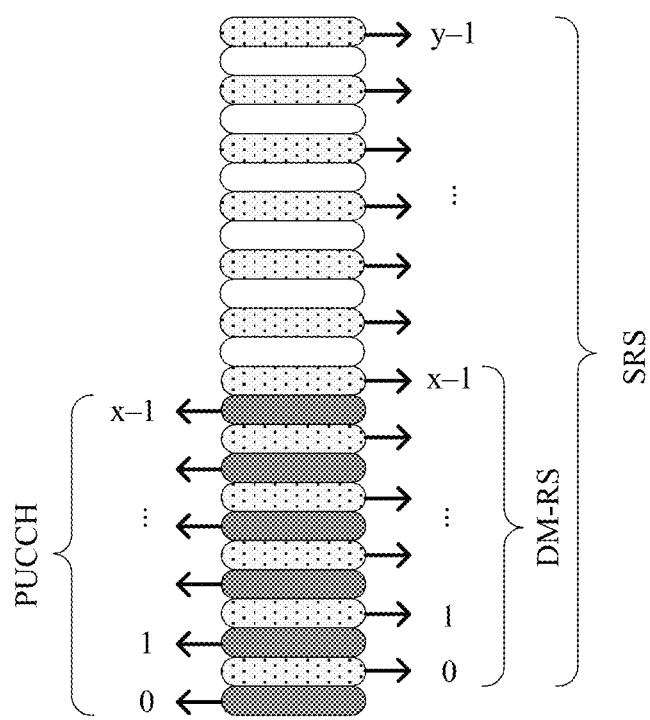
FIG. 11 is a schematic diagram of multiplexing and transmitting a PUCCH and an SRS by UE in a fixed frequency-domain resource of the PUCCH.

FIG. 11 shows an example in which the UE multiplexes and transmits the PUCCH and the SRS in the fixed frequency-domain resource of the PUCCH. In one embodiment, the UE transmits the PUCCH using a comb structure, x subcarriers in a comb 0 are used to transmit the PUCCH, and y subcarriers in a comb 1 are used to transmit the SRS. Information transmitted using x (a1 is less than or equal to a2) subcarriers that are in the comb 1 and that match the PUCCH is also used as a demodulation reference signal (DM-RS) of the PUCCH.

In one embodiment, the base station may determine, in the following manner, whether the received subcarriers that are located on the fixed frequency-domain resource carry both the PUCCH and the SRS or carry only the PUCCH: In a process in which the base station receives, according to the configuration information of the SRS, the subcarrier that carries the SRS and that is sent by the UE, if it is determined that there is an overlapping area between the frequency-domain resource for the UE to transmit the SRS and the frequency-domain resource for the UE to transmit the PUCCH in the current subframe, the base station records an identifier of the UE. When the base station receives the subcarriers that are located on the fixed frequency-domain resource sent by the UE, the base station determines that the subcarriers that are located on the fixed frequency-domain resource sent by the UE carry the PUCCH and the SRS.

Embodiments of the present disclosure further discloses a data transmission method applied to user equipment, to transmit a PUCCH and an SRS between the user equipment and a base station when transmission of the PUCCH occupies a last symbol of a subframe. The following description corresponds to the foregoing description, and a mutual reference may be made.

Figure 12:
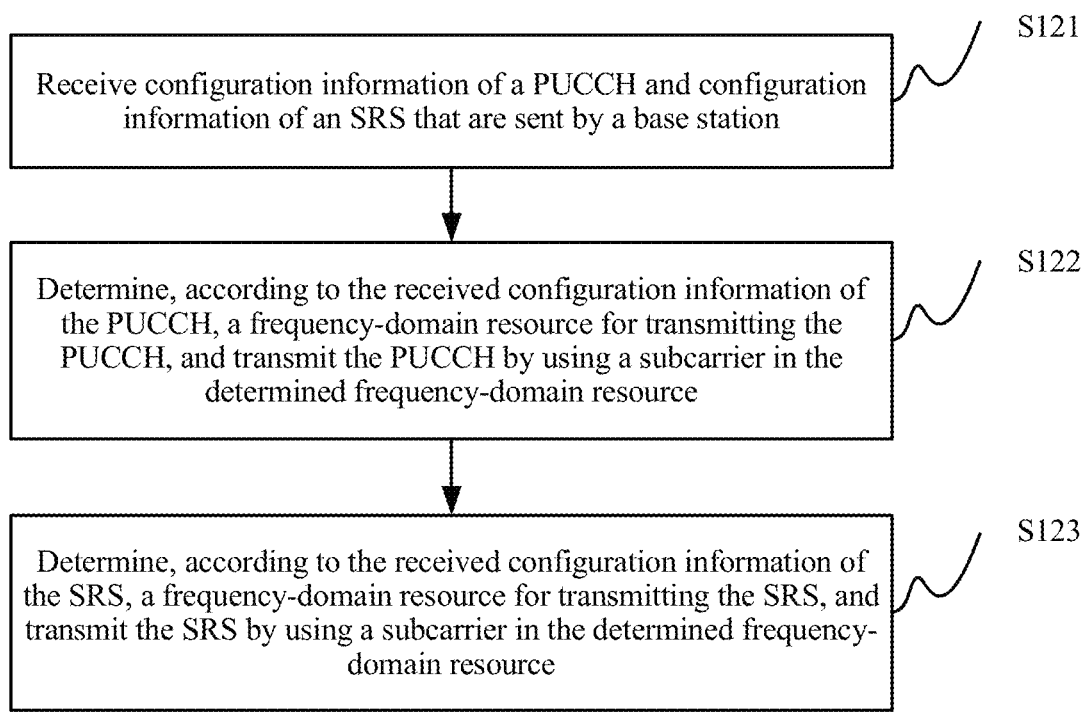
FIG. 12 is a flowchart of a data transmission method applied to user equipment according to an embodiment of the present disclosure.

Referring to FIG. 12, FIG. 12 is a flowchart of a data transmission method applied to user equipment according to an embodiment of the present disclosure. The data transmission method includes the following operations.

Operation S121: Receive configuration information of a PUCCH and configuration information of an SRS that are sent by a base station. The configuration information of the PUCCH indicates a frequency-domain resource for the UE to transmit the PUCCH, and the configuration information of the SRS indicates a frequency-domain resource for the UE to transmit the SRS.

Operation S122: Determine, according to the received configuration information of the PUCCH, a frequency-domain resource for transmitting the PUCCH, and transmit the PUCCH using a subcarrier in the determined frequency-domain resource. The PUCCH is mapped to a last symbol of a subframe.

Operation S123: Determine, according to the received configuration information of the SRS, a frequency-domain resource for transmitting the SRS, and transmit the SRS using a subcarrier in the determined frequency-domain resource. The SRS is mapped to the last symbol of the subframe.

In an LTE system and an LTE-Advanced system, a sending priority of the PUCCH is higher than a sending priority of the SRS. Generally, if one UE needs to send a PUCCH and an SRS at the same time, the UE preferably sends the PUCCH. Different UEs in a cell may send a PUCCH and an SRS to a base station at the same time. For example, at the same time, user equipment 1 (UE 1) in the cell sends a PUCCH to the base station, and user equipment 2 (UE 2) in the cell sends an SRS to the base station. In addition, in a same subframe, a frequency-domain resource occupied by one UE in the cell to send the PUCCH to the base station and a frequency-domain resource occupied by another UE in the cell to send the SRS to the base station are different. The PUCCH is mapped to a last symbol of the subframe, and the SRS is also mapped to the last symbol of the subframe.

It should be noted herein that a sequence in which the UE performs operation S122 and operation S123 depends on a data transmission requirement of the UE, and is not limited to that shown in FIG. 12.

According to the data transmission method disclosed in the present disclosure, the user equipment receives the configuration information of the PUCCH and the configuration information of the SRS that are sent by the base station. When the UE needs to send the PUCCH to the base station, the UE determines, according to the received configuration information of the PUCCH, the frequency-domain resource for transmitting the PUCCH, and transmits the PUCCH using the subcarrier in the frequency-domain resource. When the UE needs to send the SRS to the base station, the UE determines, according to the received configuration information of the SRS, the frequency-domain resource for transmitting the SRS, and transmits the SRS using the subcarrier in the frequency-domain resource. Based on the data transmission method disclosed in the present disclosure, the PUCCH and the SRS are multiplexed on a single-symbol structure, so that the PUCCH and the SRS are transmitted between the UE and the base station, and utilization of frequency-domain resources is improved.

The base station may send the configuration information of the PUCCH to the UE in the cell in a plurality of manners. Correspondingly, there are also a plurality of manners in which the UE in the cell may determine, according to the received configuration information of the PUCCH, the frequency-domain resource for transmitting the PUCCH.

Figure 13:
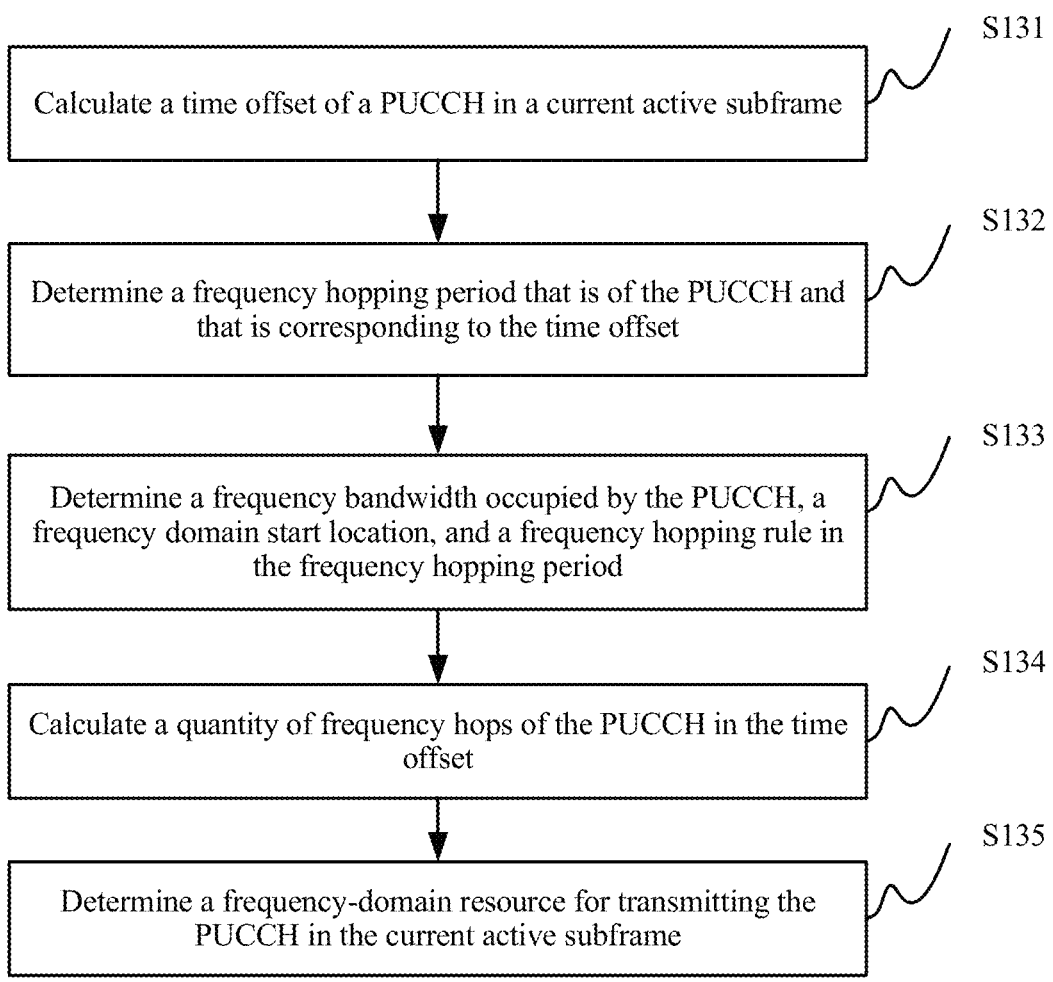
FIG. 13 is a flowchart of a method for user equipment to determine a frequency-domain resource for transmitting a PUCCH in a current active subframe according to an embodiment of the present disclosure.

When the base station instructs, using the configuration information of the PUCCH, the UE to transmit the PUCCH in a frequency hopping manner, that is, the base station determines the configuration information of the PUCCH in the manner shown in FIG. 3, the UE determines, in a manner shown in FIG. 13, according to the received configuration information of the PUCCH, the frequency-domain resource for transmitting the PUCCH. The manner includes the following operations.

Operation S131: Calculate a time offset $T_{offset,cell}$ of the PUCCH in a current active subframe according to a sequence number N of the current active subframe and a minimum frequency hopping period $T_{PUCCH,cell}$ of the PUCCH in the configuration information of the PUCCH, where $T_{offset,cell} = N \bmod T_{PUCCH,cell}$.

Operation S132: Determine, according to the configuration information of the PUCCH, a frequency hopping period $T_{PUCCH}$ that is of the PUCCH and that is corresponding to the time offset $T_{offset,cell}$ in the current active subframe.

It should be noted herein that if in the configuration information of the PUCCH, the frequency hopping period of the PUCCH corresponding to the time offset $T_{offset,cell}$ includes 2 ms and 10 ms, it needs to be further determined whether the frequency hopping period of the PUCCH corresponding to the time offset $T_{offset,cell}$ in the current active subframe includes 10 ms. Specifically, $(N-T_{offset,cell})/T_{PUCCH,cell}$ is calculated. If the ratio is a multiple of 5, it is determined that the frequency hopping period of the PUCCH corresponding to the time offset in the current active subframe includes 2 ms and 10 ms. If the ratio is not a multiple of 5, it is determined that the frequency hopping period of the PUCCH corresponding to the time offset in the current active subframe includes only 2 ms.

Operation S133: Determine, according to the configuration information of the PUCCH, a frequency bandwidth occupied by the PUCCH, a frequency domain start location, and a frequency hopping rule in the frequency hopping period $T_{PUCCH}$.

Operation S134: Calculate a quantity $N_{PUCCH}$ of frequency hops of the PUCCH in the time offset $T_{offset,cell}$, where $N_{PUCCH} = \lfloor N/T_{PUCCH} \rfloor$.

Operation S135: Determine, according to the frequency bandwidth occupied by the PUCCH, the frequency domain start location, the frequency hopping rule in the frequency hopping period $T_{PUCCH}$, the quantity $N_{PUCCH}$ of frequency hops, and a frequency-domain resource for transmitting the PUCCH in the current active subframe.

In one embodiment, after operation S131 is performed, if the received configuration information of the PUCCH does not include a frequency-domain resource configured for the time offset $T_{offset,cell}$, it is determined that the frequency-domain resource for transmitting the PUCCH is a fixed frequency-domain resource of the PUCCH included in the configuration information of the PUCCH. The fixed frequency-domain resource of the PUCCH includes a frequency bandwidth occupied by the PUCCH and a frequency domain start location.

When the base station instructs, using the configuration information of the PUCCH, the UE to transmit the PUCCH using the fixed frequency-domain resource, that is, the configuration information of the PUCCH determined by the base station includes only the fixed frequency-domain resource of the PUCCH, that the UE determining, according to the received configuration information of the PUCCH, the frequency-domain resource for transmitting the PUCCH includes: obtaining the fixed frequency-domain resource included in the configuration information of the PUCCH, and determining the fixed frequency-domain resource as the frequency-domain resource for transmitting the PUCCH.

Figure 14:
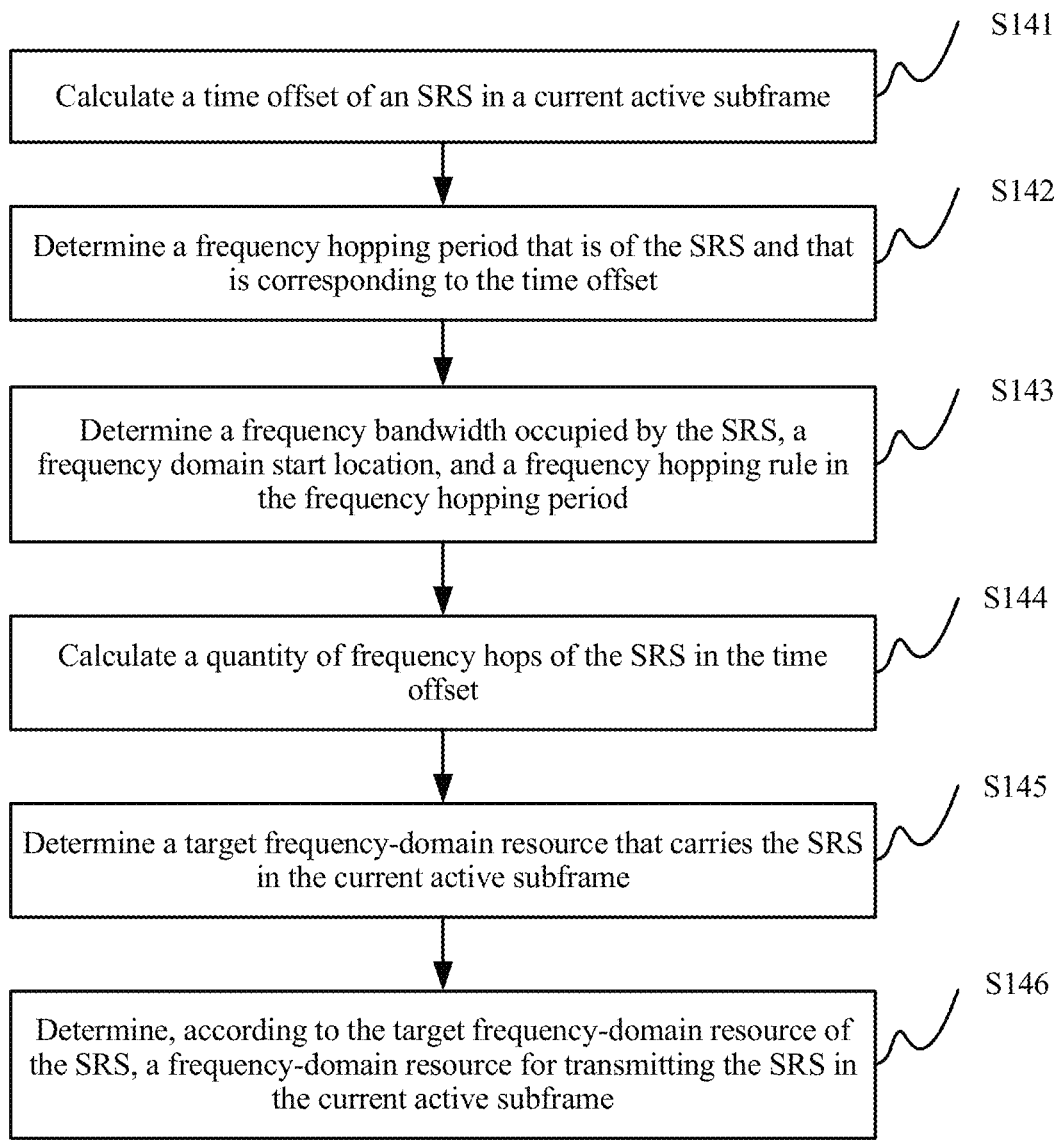
FIG. 14 is a flowchart of a method for user equipment to determine a frequency-domain resource for transmitting an SRS in a current active subframe according to an embodiment of the present disclosure.

As shown in FIG. 14, in one embodiment, a process in which the UE determines, according to the received configuration information of the SRS, the frequency-domain resource for transmitting the SRS includes the following operations.

Operation S141: Calculate a time offset $T'_{offset,cell}$ of the SRS in a current active subframe according to the sequence number N of the current active subframe and a minimum frequency hopping period $T_{SRS,cell}$ of the SRS in the configuration information of the SRS, where $T'_{offset,cell} = N \bmod T_{SRS,cell}$.

Operation S142: Determine, according to the configuration information of the SRS, a frequency hopping period $T_{SRS}$ of the SRS a corresponding to the time offset $T'_{offset,cell}$ in the current subframe.

It should be noted herein that if in the configuration information of the SRS, the frequency hopping period of the SRS corresponding to the time offset $T'_{offset,cell}$ includes 2 ms and 10 ms, it needs to be further determined whether the frequency hopping period of the SRS corresponding to the time offset $T'_{offset,cell}$ in the current active subframe includes 10 ms. Specifically, $(N-T'_{offset,cell})/T_{SRS,cell}$ is calculated. If the ratio is a multiple of 5, it is determined that the frequency hopping period of the SRS corresponding to the time offset in the current active subframe includes 2 ms and 10 ms. If the ratio is not a multiple of 5, it is determined that the frequency hopping period of the SRS corresponding to the time offset in the current active subframe includes only 2 ms.

Operation S143: Determine, according to the configuration information of the SRS, a frequency bandwidth occupied by the SRS, a frequency domain start location, and a frequency hopping rule in the frequency hopping period $T_{SRS}$.

Operation S144: Calculate a quantity $N_{SRS}$ of frequency hops of the SRS in the time offset $T'_{offset,cell}$, where $N_{SRS} = \lfloor N/T_{SRS} \rfloor$.

Operation S145: Determine, according to the frequency bandwidth occupied by the SRS, the frequency domain start location, and the frequency hopping rule in the frequency hopping period $T_{SRS}$, and the quantity $N_{SRS}$ of frequency hops, a target frequency-domain resource of the SRS in the current active subframe.

Operation S146: Determine, according to the target frequency-domain resource of the SRS, a frequency-domain resource for transmitting the SRS in the current active subframe.

It should be noted that when the base station dynamically allocates, to the UE in the cell, frequency-domain resources for transmitting the PUCCH and the SRS, it can be ensured that there is no conflict between the frequency-domain resources that are used by the UE to transmit the PUCCH and the SRS in a same subframe. When the base station dynamically allocates, to the UE in the cell, the frequency-domain resource for transmitting the SRS, and instructs the UE to transmit the PUCCH using the fixed frequency-domain resource, a frequency-domain resource conflict may occur in a process in which different UEs in the cell transmits the SRS and the PUCCH to the base station.

In one embodiment, there are a plurality of manners in which the UE may determine, based on the target frequency-domain resource of the SRS, the frequency-domain resource for transmitting the SRS in the current active subframe. Separate descriptions are provided in the following.

In one embodiment, when the target frequency-domain resource of the SRS is located on a non-edge area of an SRS resource pool, and the target frequency-domain resource of the SRS and the frequency-domain resource for transmitting the PUCCH are not overlapping, the target frequency-domain resource of the SRS is determined as the frequency-domain resource for transmitting the SRS in the current active subframe.

In one embodiment, the transmitting the SRS using a subcarrier in the determined frequency-domain resource includes: modulating the SRS on the determined frequency-domain resource using a pre-stored ZC sequence.

In one embodiment, when the target frequency-domain resource of the SRS is located on an edge area of an SRS resource pool, and target frequency-domain resource of the SRS and the frequency-domain resource for transmitting the PUCCH are not overlapping, the target frequency-domain resource of the SRS and a to-be-bundled frequency-domain resource are determined as the frequency-domain resource for transmitting the SRS in the current active subframe. The to-be-bundled frequency-domain resource is an idle frequency-domain resource, in frequency-domain resources in a communications system, that is not covered by the SRS resource pool and that is adjacent to the target frequency-domain resource.

In one embodiment, the transmitting the SRS using a subcarrier in the determined frequency-domain resource includes: extending a pre-stored ZC sequence, where a length of the extended ZC sequence is (n+m1)×6, where n is a quantity of resource groups included in the target frequency-domain resource of the SRS, and m1 is a quantity of resource groups included in the to-be-bundled frequency-domain resource; and modulating, using the extended ZC sequence, the SRS on the determined frequency-domain resource.

In one embodiment, when there is an overlapping area between the target frequency-domain resource of the SRS and the frequency-domain resource occupied by the PUCCH, and frequency-domain resources that are in the target frequency-domain resource of the SRS and that are not overlapping with the frequency-domain resource occupied by the PUCCH are continuous frequency-domain resources, the frequency-domain resources that are in the target frequency-domain resource of the SRS and that are not overlapping with the frequency-domain resource occupied by the PUCCH are used as the frequency-domain resource for transmitting the SRS in the current active subframe.

In one embodiment, the transmitting the SRS using a subcarrier in the determined frequency-domain resource includes: compressing a pre-stored ZC sequence, where a length of the compressed ZC sequence is (n−m2)×6, where m2 is a quantity of resource groups included in the overlapping area between the target frequency-domain resource of the SRS and the frequency-domain resource occupied by the PUCCH; and modulating, using the compressed ZC sequence, the SRS on the determined frequency-domain resource.

In one embodiment, when there is an overlapping area between the target frequency-domain resource of the SRS and the frequency-domain resource of the PUCCH, and the frequency-domain resource of the PUCCH separates the target frequency-domain resource of the SRS into a first frequency-domain resource and a second frequency-domain resource, one or more of the first frequency-domain resource and the second frequency-domain resource are used, according to a preset rule, as the frequency-domain resource for transmitting the SRS in the current active subframe.

In one embodiment, the transmitting the SRS using a subcarrier in the determined frequency-domain resource includes: compressing a pre-stored ZC sequence, where a length of the compressed ZC sequence is n1×6, where n1 is a quantity of resource groups included in the frequency-domain resource for transmitting the SRS in the current active subframe; and modulating, using the compressed ZC sequence, the SRS on the determined frequency-domain resource.

In one embodiment, when the base station dynamically allocates, to the UE in the cell, the frequency-domain resource for transmitting the PUCCH, after the UE determines, using the method shown in FIG. 13, the frequency-domain resource for transmitting the PUCCH, the UE transmits the PUCCH using the subcarrier in the frequency-domain resource.

In one embodiment, when the base station instructs the UE to transmit the PUCCH using the fixed frequency-domain resource, a process in which the UE transmits the PUCCH using the subcarrier in the determined frequency-domain resource includes: when the UE sends only the PUCCH, transmitting the PUCCH using a subcarrier in the fixed frequency-domain resource; and when the UE sends both the PUCCH and the SRS, transmitting the PUCCH using a first-sequence subcarrier in the fixed frequency-domain resource, and transmitting the SRS using a second-sequence subcarrier in the fixed frequency-domain resource.

The first-sequence subcarrier is an odd-number sequence subcarrier in the fixed frequency-domain resource, and the second-sequence subcarrier is an even-number sequence subcarrier in the fixed frequency-domain resource, or the first-sequence subcarrier is an even-number sequence subcarrier in the fixed frequency-domain resource, and the second-sequence subcarrier is an odd-number sequence subcarrier in the fixed frequency-domain resource.

In a process in which the UE sends only the SRS, if it is determined that the frequency-domain resource for transmitting the SRS and the frequency-domain resource for transmitting the PUCCH are overlapping, the UE quits sending an SRS located on an overlapping frequency-domain resource, and then when it is determined that the PUCCH needs to be sent, sending both the PUCCH and the SRS that is located on the overlapping frequency-domain resource.

An embodiment of the present disclosure further discloses a data transmission apparatus applied to a base station. The data transmission apparatus applied to the base station described below corresponds to the foregoing data transmission method applied to the base station, and mutual reference may be made.

Figure 15:
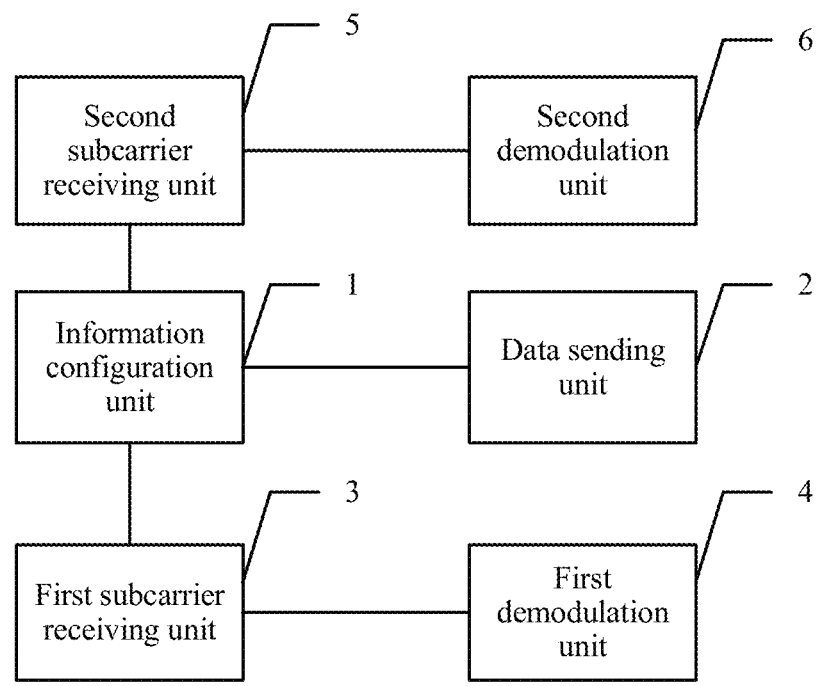
FIG. 15 is a schematic structural diagram of a data transmission apparatus applied to a base station according to an embodiment of the present disclosure.

Referring to FIG. 15, FIG. 15 is a schematic structural diagram of a data transmission apparatus applied to a base station according to an embodiment of the present disclosure. The data transmission apparatus includes an information configuration unit 1, a data sending unit 2, a first subcarrier receiving unit 3, a first demodulation unit 4, a second subcarrier receiving unit 5, and a second demodulation unit 6.

The information configuration unit 1 is configured to determine configuration information of a physical uplink control channel (PUCCH) and configuration information of an uplink sounding reference signal (SRS). The configuration information of the PUCCH indicates a frequency-domain resource for transmitting the PUCCH. The configuration information of the SRS indicates a frequency-domain resource for transmitting the SRS. The frequency-domain resource for transmitting the PUCCH is different than, but locates on a same subframe as, the frequency-domain resource for transmitting the SRS. The PUCCH is mapped to a last symbol of the subframe, and the SRS is mapped to the last symbol of the subframe.

The data sending unit 2 is configured to send the configuration information of the PUCCH and the configuration information of the SRS to user equipment (UE) in a cell.

The first subcarrier receiving unit 3 is configured to receive, according to the configuration information of the PUCCH, a subcarrier that carries the PUCCH and that is sent by the UE.

The first demodulation unit 4 is configured to demodulate the subcarrier that carries the PUCCH to obtain the PUCCH.

The second subcarrier receiving unit 5 is configured to receive, according to the configuration information of the SRS, a subcarrier that carries the SRS and that is sent by the UE.

The second demodulation unit 6 is configured to demodulate the subcarrier that carries the SRS to obtain the SRS.

Based on the data transmission apparatus disclosed in the present disclosure, the PUCCH and the SRS are multiplexed on a single-symbol structure, so that the PUCCH and the SRS are transmitted between the UE and the base station, and utilization of frequency-domain resources is improved.

In an embodiment, the information configuration unit 1 includes a first information configuration module.

The configuration information, determined by the first information configuration module, of the SRS includes: a minimum frequency hopping period of the SRS, frequency hopping periods of the SRS that are configured in different time offsets, and a frequency bandwidth occupied by the SRS, a frequency domain start location, and a frequency hopping rule in each frequency hopping period of the SRS.

The configuration information, determined by the first information configuration module, of the PUCCH includes: a minimum frequency hopping period of the PUCCH, where the minimum frequency hopping period of the PUCCH is the same as the minimum frequency hopping period of the SRS; frequency hopping periods of the PUCCH that are configured in different time offsets, where a frequency hopping period of the PUCCH and a frequency hopping period of the SRS that are configured in a same time offset are the same; and a frequency bandwidth occupied by the PUCCH, a frequency domain start location, and a frequency hopping rule in each frequency hopping period of the PUCCH, where the frequency hopping rule of the PUCCH is the same as the frequency hopping rule of the SRS, the frequency domain start location of the SRS is outside the frequency-domain resource of the PUCCH, and an initial frequency-domain resource of the SRS and an initial frequency-domain resource of the PUCCH are not overlapping.

In specific application, because the UE in the cell does not need to transmit the SRS in all subframes, but the UE still needs to transmit the PUCCH in these subframes, frequency-domain resources occupied when the UE transmits the PUCCH in these subframes need to be determined. The configuration information, determined by the first information configuration module, of the PUCCH further includes: a fixed frequency-domain resource of the PUCCH, and the fixed frequency-domain resource of the PUCCH includes a frequency bandwidth occupied by the PUCCH and a frequency domain start location.

Figure 16:
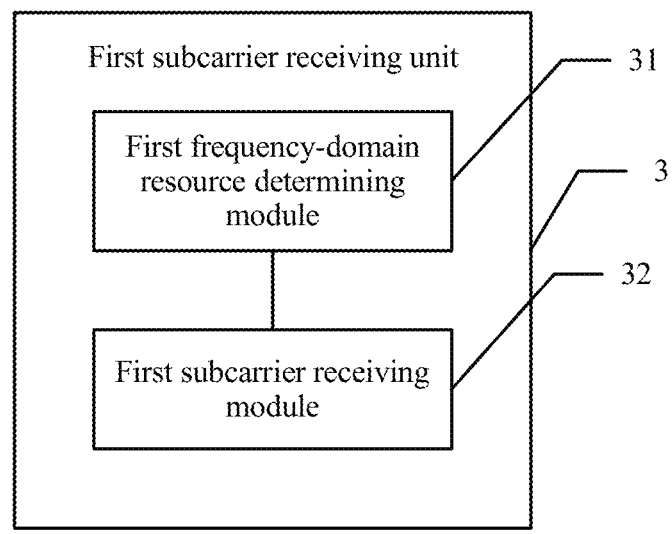
FIG. 16 is a schematic structural diagram of a first subcarrier receiving unit according to an embodiment of the present disclosure.

When the information configuration unit 1 includes the first information configuration module, the first subcarrier receiving unit 3 uses a structure shown in FIG. 16. The first subcarrier receiving unit 3 includes: a first frequency-domain resource determining module 31, configured to determine, according to the configuration information of the PUCCH, a frequency-domain resource occupied by the subcarrier that carries the PUCCH in a current subframe; and a first subcarrier receiving module 32, configured to receive the subcarrier in the frequency-domain resource determined by the first frequency-domain resource determining module.

That the first frequency-domain resource determining module 31 determines, according to the configuration information of the PUCCH, a frequency-domain resource occupied by the subcarrier that carries the PUCCH in a current subframe includes:

calculating a time offset $T_{offset,cell}$ of the PUCCH in the current subframe according to a sequence number N of the current subframe and the minimum frequency hopping period $T_{PUCCH,cell}$ of the PUCCH, where $T_{offset,cell} = N \bmod T_{PUCCH,cell}$;

determining a frequency hopping period $T_{PUCCH}$ of the PUCCH corresponding to the time offset $T_{offset,cell}$ in the current subframe;

determining a frequency bandwidth occupied by the PUCCH, a frequency domain start location, and a frequency hopping rule in the frequency hopping period $T_{PUCCH}$;

calculating a quantity $N_{PUCCH}$ of frequency hops of the PUCCH in the time offset $T_{offset,cell}$, where $N_{PUCCH} = \lfloor N/T_{PUCCH} \rfloor$; and determining, according to the frequency bandwidth occupied by the PUCCH, the frequency domain start location, and the frequency hopping rule in the frequency hopping period $T_{PUCCH}$, and the quantity $N_{PUCCH}$ of frequency hops, the frequency-domain resource occupied by the subcarrier that carries the PUCCH in the current subframe.

In one embodiment, that the first frequency-domain resource determining module 31 determines, according to the configuration information of the PUCCH, a frequency-domain resource occupied by the subcarrier that carries the PUCCH in a current subframe further includes: after the time offset $T_{offset,cell}$ of the PUCCH in the current subframe is calculated, if it is determined that no corresponding frequency-domain resource is configured for the time offset $T_{offset,cell}$, determining that the frequency-domain resource occupied by the subcarrier that carries the PUCCH in the current subframe is a preconfigured fixed frequency-domain resource of the PUCCH.

Figure 17:
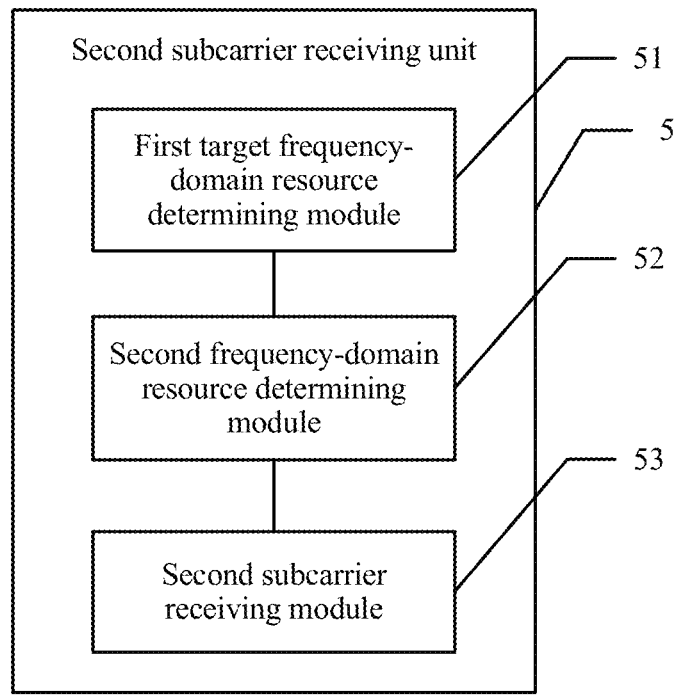
FIG. 17 is a schematic structural diagram of a second subcarrier receiving unit according to an embodiment of the present disclosure.

The second subcarrier receiving unit 5 uses a structure shown in FIG. 17. The second subcarrier receiving unit 5 includes: a first target frequency-domain resource determining module 51, configured to determine, according to the configuration information of the SRS, a target frequency-domain resource occupied by the subcarrier that carries the SRS in a current subframe; a second frequency-domain resource determining module 52, configured to determine, based on the target frequency-domain resource, a frequency-domain resource occupied by the subcarrier that carries the SRS in the current subframe; and a second subcarrier receiving module 53, configured to receive the subcarrier in the frequency-domain resource determined by the second frequency-domain resource determining module.

That the target frequency-domain resource determining module 51 determines, according to the configuration information of the SRS, a target frequency-domain resource occupied by the subcarrier that carries the SRS in a current subframe includes:

calculating a time offset $T'_{offset,cell}$ of the SRS in the current subframe according to a sequence number N of the current subframe and the minimum frequency hopping period $T_{SRS,cell}$ of the SRS, where $T'_{offset,cell} = N \bmod T_{SRS,cell}$;

determining a frequency hopping period $T_{SRS}$ of the SRS corresponding to the time offset $T'_{offset,cell}$ in the current subframe;

determining a frequency bandwidth occupied by the SRS, a frequency domain start location, and a frequency hopping rule in the frequency hopping period $T_{SRS}$;

calculating a quantity $N_{SRS}$ of frequency hops of the SRS in the time offset $T'_{offset,cell}$, where $N_{SRS} = \lfloor N/T_{SRS} \rfloor$; and determining, according to the frequency bandwidth occupied by the SRS, the frequency domain start location, and the frequency hopping rule in the frequency hopping period $T_{SRS}$, and the quantity $N_{SRS}$ of frequency hops, the target frequency-domain resource occupied by the subcarrier that carries the SRS in the current subframe.

There are a plurality of manners in which the second frequency-domain resource determining module 52 may determine, based on the target frequency-domain resource of the SRS, the frequency-domain resource occupied by the subcarrier that carries the SRS in the current subframe. Separate descriptions are provided in the following.

In one embodiment, the second frequency-domain resource determining module 52 is configured to: when the target frequency-domain resource is not located on an edge area of an SRS resource pool, use the target frequency-domain resource as the frequency-domain resource occupied by the subcarrier that carries the SRS.

In one embodiment, the second demodulation unit 6 is configured to demodulate the subcarrier that carries the SRS to obtain the SRS.

In one embodiment, the second frequency-domain resource determining module 52 is configured to: when the target frequency-domain resource is located on an edge area of an SRS resource pool, determine the target frequency-domain resource and a to-be-bundled frequency-domain resource as the frequency-domain resource occupied by the subcarrier that carries the SRS. The to-be-bundled frequency-domain resource is a frequency-domain resource, in frequency-domain resources in a communications system, that is not covered by the SRS resource pool and that is adjacent to the target frequency-domain resource.

The second demodulation unit 6 is specifically configured to: extend a pre-stored ZC sequence, and demodulate, using the extended ZC sequence, the subcarrier that carries the SRS to obtain the SRS, where a length of the extended ZC sequence is (n+m1)×6, where n is a quantity of resource groups included in the target frequency-domain resource, and m1 is a quantity of resource groups included in the to-be-bundled frequency-domain resource.

In another embodiment, the information configuration unit 1 includes a second information configuration module.

The configuration information, determined by the second information configuration module, of the SRS includes: a minimum frequency hopping period of the SRS in a cell, frequency hopping periods of the SRS that are configured in different time offsets, and a frequency bandwidth occupied by the SRS, a frequency domain start location, and a frequency hopping rule in each frequency hopping period of the SRS. The configuration information, determined by the second information configuration module, of the PUCCH includes: a fixed frequency-domain resource of the PUCCH, where the fixed frequency-domain resource of the PUCCH includes a frequency bandwidth occupied by the PUCCH and a frequency domain start location.

When the information configuration unit 1 includes the second information configuration module, the structure of the second subcarrier receiving unit 5 is shown in FIG. 17. The second subcarrier receiving unit 5 includes: a first target frequency-domain resource determining module 51, configured to determine, according to the configuration information of the SRS, a target frequency-domain resource occupied by the subcarrier that carries the SRS in a current subframe; a second frequency-domain resource determining module 52, configured to determine, based on the target frequency-domain resource, a frequency-domain resource occupied by the subcarrier that carries the SRS in the current subframe; and a second subcarrier receiving module 53, configured to receive the subcarrier in the frequency-domain resource determined by the second frequency-domain resource determining module. For details that the target frequency-domain resource determining module 51 determines, according to the configuration information of the SRS, a target frequency-domain resource occupied by the subcarrier that carries the SRS in a current subframe, refer to the foregoing description.

There are a plurality of manners in which the second frequency-domain resource determining module 52 may determine, based on the target frequency-domain resource of the SRS, the frequency-domain resource occupied by the subcarrier that carries the SRS in the current subframe. Separate descriptions are provided in the following.

In one embodiment, the second frequency-domain resource determining module 52 is specifically configured to: when the target frequency-domain resource and the frequency-domain resource of the PUCCH are not overlapped, and the target frequency-domain resource is located on a non-edge area of an SRS resource pool, determine the target frequency-domain resource as the frequency-domain resource occupied by the subcarrier that carries the SRS.

The second demodulation unit 6 is specifically configured to demodulate, using a pre-stored ZC sequence, the subcarrier that carries the SRS to obtain the SRS.

In one embodiment, the second frequency-domain resource determining module 52 is specifically configured to: when the target frequency-domain resource and the frequency-domain resource of the PUCCH are not overlapped, and the target frequency-domain resource is located on an edge area of an SRS resource pool, determine the target frequency-domain resource and a to-be-bundled frequency-domain resource as the frequency-domain resource occupied by the subcarrier that carries the SRS. The to-be-bundled frequency-domain resource is a frequency-domain resource, in frequency-domain resources in a communications system, that is not covered by the SRS resource pool and that is adjacent to the target frequency-domain resource.

The second demodulation unit 6 is specifically configured to extend a pre-stored ZC sequence, and demodulate, using the extended ZC sequence, the subcarrier that carries the SRS to obtain the SRS. A length of the extended ZC sequence is (n+m1)×6, where n is a quantity of resource groups included in the target frequency-domain resource, and m1 is a quantity of resource groups included in the to-be-bundled frequency-domain resource.

In one embodiment, the second frequency-domain resource determining module 52 is specifically configured to: when there is an overlapping area between the target frequency-domain resource and the frequency-domain resource of the PUCCH, and frequency-domain resources that are in the target frequency-domain resource and that are not overlapping with the frequency-domain resource of the PUCCH are continuous frequency-domain resources, determine the frequency-domain resources that are in the target frequency-domain resource and that are not overlapping with the frequency-domain resource of the PUCCH as the frequency-domain resource occupied by the subcarrier that carries the SRS.

The second demodulation unit 6 is specifically configured to: compress a pre-stored ZC sequence, and demodulate, using the compressed ZC sequence, the subcarrier that carries the SRS to obtain the SRS. A length of the compressed ZC sequence is (n−m2)×6, where n is a quantity of resource groups included in the target frequency-domain resource, and m2 is a quantity of resource groups included in the overlapped area between the target frequency-domain resource and the frequency-domain resource of the PUCCH.

In one embodiment, the second frequency-domain resource determining module 52 is specifically configured to: when there is an overlapping area between the target frequency-domain resource and the frequency-domain resource of the PUCCH, and the frequency-domain resource of the PUCCH separates the target frequency-domain resource into a first frequency-domain resource and a second frequency-domain resource, determine, according to a preset rule, one or more of the first frequency-domain resource and the second frequency-domain resource as the frequency-domain resource occupied by the subcarrier that carries the SRS.

The second demodulation unit 6 is specifically configured to: compress a pre-stored ZC sequence, and demodulate, using the compressed ZC sequence, the subcarrier that carries the SRS to obtain the SRS. A length of the compressed ZC sequence is n1×6, where n1 is a quantity of resource groups included in the frequency-domain resource occupied by the subcarrier that carries the SRS.

In a preferred solution, in a process in which the UE sends the SRS, if it is determined that there is a conflict between the frequency-domain resource for transmitting the SRS in the current subframe and the frequency-domain resource for transmitting the PUCCH in the current subframe, the UE transmits a part of the SRS in the foregoing manners using a frequency-domain resource that is not overlapped, and quits sending an SRS located on an overlapped frequency-domain resource. Then in a process in which the UE sends the PUCCH using the fixed frequency-domain resource, the SRS located on the overlapping frequency-domain resource is also sent.

Specifically, the UE transmits the PUCCH using a first-sequence subcarrier in the fixed frequency-domain resource of the PUCCH, and transmits the SRS using a second-sequence subcarrier in the fixed frequency-domain resource of the PUCCH. The first-sequence subcarrier is an odd-number sequence subcarrier in the fixed frequency-domain resource of the PUCCH, and the second-sequence subcarrier is an even-number sequence subcarrier in the fixed frequency-domain resource of the PUCCH, or the first-sequence subcarrier is an even-number sequence subcarrier in the fixed frequency-domain resource of the PUCCH, and the second-sequence subcarrier is an odd-number sequence subcarrier in the fixed frequency-domain resource of the PUCCH.

Correspondingly, the first subcarrier receiving unit 3 includes a third subcarrier receiving module. The third subcarrier receiving module is configured to receive subcarriers in the fixed frequency-domain resource of the PUCCH.

The first demodulation unit 4 includes a first demodulation module and a second demodulation module.

The first demodulation module is configured to: when it is determined that the received subcarriers sent by the UE carry only the PUCCH, demodulate the subcarriers in the fixed frequency-domain resource of the PUCCH to obtain the PUCCH.

The second demodulation module is configured to: when it is determined that the received subcarriers sent by the same UE carry both the PUCCH and the SRS, demodulate a first-sequence subcarrier in the fixed frequency-domain resource of the PUCCH to obtain the PUCCH, and demodulate a second-sequence subcarrier in the fixed frequency-domain resource to obtain the SRS.

The first-sequence subcarrier is an odd-number sequence subcarrier in the fixed frequency-domain resource, and the second-sequence subcarrier is an even-number sequence subcarrier in the fixed frequency-domain resource, or the first-sequence subcarrier is an even-number sequence subcarrier in the fixed frequency-domain resource, and the second-sequence subcarrier is an odd-number sequence subcarrier in the fixed frequency-domain resource.

The present disclosure further discloses a base station, and the base station includes the foregoing data transmission apparatus.

Figure 18:
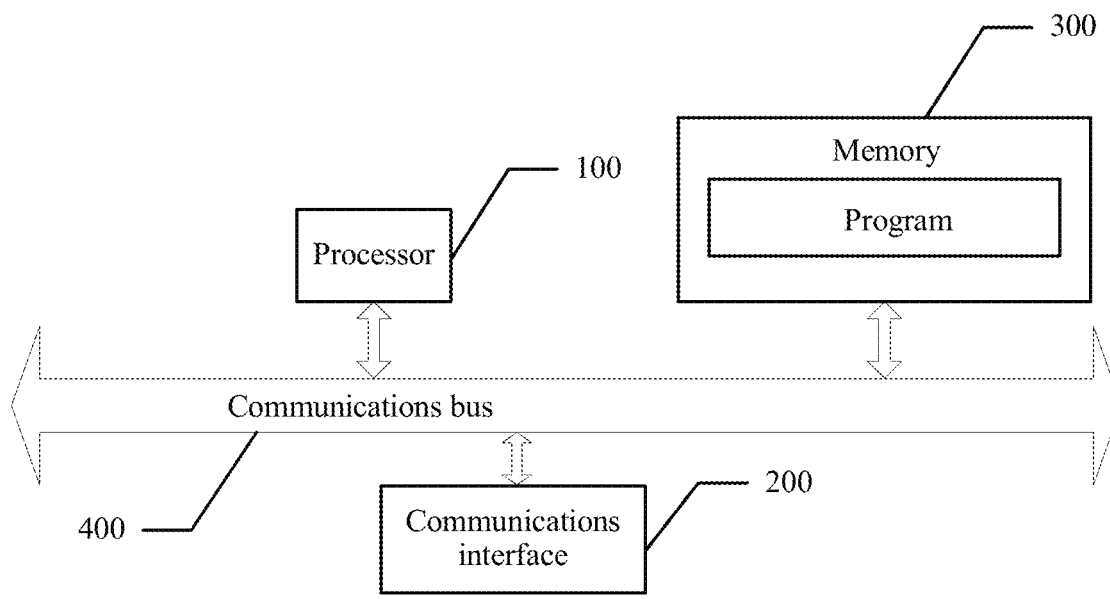
FIG. 18 is a schematic structural diagram of hardware of a base station according to an embodiment of the present disclosure.

Referring to FIG. 18, FIG. 18 shows a structure of hardware of the base station. The base station may include a processor 100, a communications interface 200, a memory 300, and a communications bus 400.

The processor 100 is configured to execute a program. The communications interface 200 is configured to send and receive data. The memory 300 is configured to store the program. The processor 100, the communications interface 200, and the memory 300 complete mutual communication using the communications bus 400. The processor 100 may be a central processing unit CPU, or an application-specific integrated circuit Application Specific Integrated Circuit (ASIC), or one or more integrated circuits configured to implement this embodiment of the present disclosure. The memory 300 may include a high-speed RAM memory, or may include a nonvolatile memory such as at least one magnetic disk storage.

In one embodiment, the program is configured to:

determine configuration information of a physical uplink control channel (PUCCH) and configuration information of an uplink sounding reference signal (SRS), where the configuration information of the PUCCH indicates a frequency-domain resource for transmitting the PUCCH, the configuration information of the SRS indicates a frequency-domain resource for transmitting the SRS, the frequency-domain resource for transmitting the PUCCH is different than, but is in a same subframe as the frequency-domain resource for transmitting the SRS, the PUCCH is mapped to a last symbol of the subframe, and the SRS is mapped to the last symbol of the subframe;

control the communications interface to send the configuration information of the PUCCH and the configuration information of the SRS to user equipment (UE) in a cell;

control, according to the configuration information of the PUCCH, the communications interface to receive a subcarrier that carries the PUCCH and that is sent by the UE, and demodulate the subcarrier that carries the PUCCH to obtain the PUCCH; and control, according to the configuration information of the SRS, the communications interface to receive a subcarrier that carries the SRS and that is sent by the UE, and demodulate the subcarrier that carries the SRS to obtain the SRS.

The present disclosure further discloses a data transmission apparatus applied to user equipment. The data transmission apparatus applied to the user equipment described below is corresponding to the foregoing data transmission method applied to the user equipment, and mutual reference may be made.

Figure 19:
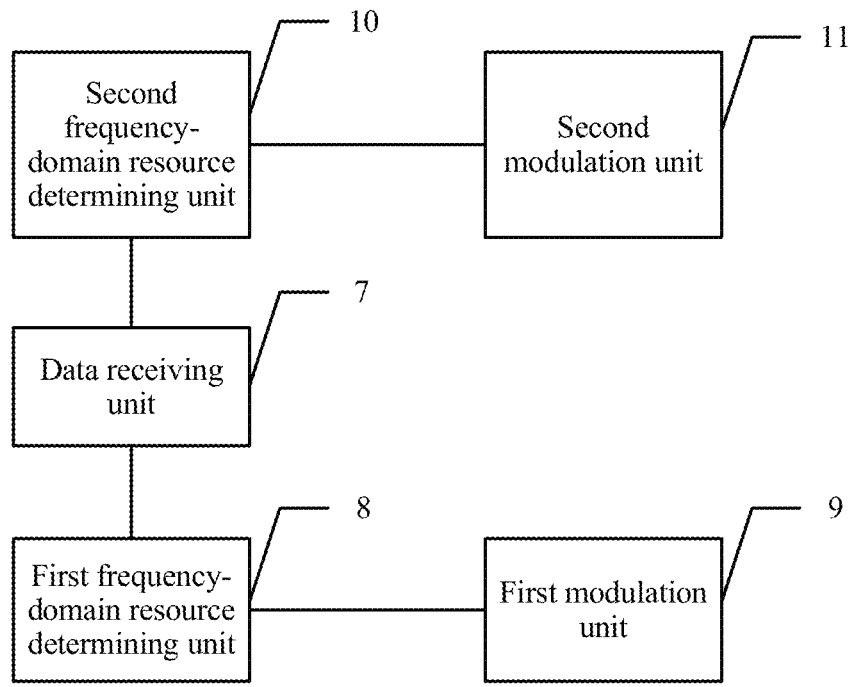
FIG. 19 is a schematic structural diagram of a data transmission apparatus applied to user equipment according to an embodiment of the present disclosure.

Referring to FIG. 19, FIG. 19 is a schematic structural diagram of a data transmission apparatus applied to user equipment according to the present disclosure. The data transmission apparatus includes a data receiving unit 7, a first frequency-domain resource determining unit 8, a first modulation unit 9, a second frequency-domain resource determining unit 10, and a second modulation unit 11.

The data receiving unit 7 is configured to receive configuration information of a physical uplink control channel (PUCCH) and configuration information of an uplink sounding reference signal (SRS) that are sent by a base station. The configuration information of the PUCCH indicates a frequency-domain resource for transmitting the PUCCH, and the configuration information of the SRS indicates a frequency-domain resource for transmitting the SRS.

The first frequency-domain resource determining unit 8 is configured to determine, according to the received configuration information of the PUCCH, the frequency-domain resource for transmitting the PUCCH.

The first modulation unit 9 is configured to transmit the PUCCH using a subcarrier in the frequency-domain resource determined by the first frequency-domain resource determining unit 8. The PUCCH is mapped to a last symbol of a subframe.

The second frequency-domain resource determining unit 10 is configured to determine, according to the received configuration information of the SRS, the frequency-domain resource for transmitting the SRS.

The second modulation unit 11 is configured to transmit the SRS using a subcarrier in the frequency-domain resource determined by the second frequency-domain resource determining unit 10. The SRS is mapped to the last symbol of the subframe.

According to the data transmission apparatus applied to the user equipment according to an embodiment of the present disclosure, the PUCCH and the SRS are multiplexed on a single-symbol structure, so that the PUCCH and the SRS are transmitted between the UE and the base station, and utilization of frequency-domain resources is improved.

The base station may send the configuration information of the PUCCH to the UE in the cell in a plurality of manners. Correspondingly, there are also a plurality of manners in which the UE in the cell may determine, according to the received configuration information of the PUCCH, the frequency-domain resource for transmitting the PUCCH.

In an embodiment, the first frequency-domain resource determining unit 8 includes a fourth frequency-domain resource determining module. That the fourth frequency-domain resource determining module determines, according to the received configuration information of the PUCCH, the frequency-domain resource for transmitting the PUCCH includes:

calculating a time offset $T_{offset,cell}$ of the PUCCH in a current active subframe according to a sequence number N of the current active subframe and a minimum frequency hopping period $T_{PUCCH,cell}$ of the PUCCH in the configuration information of the PUCCH, where $T_{offset,cell} = N \bmod T_{PUCCH,cell}$;

determining, according to the configuration information of the PUCCH, a frequency hopping period $T_{PUCCH}$ of the PUCCH corresponding to the time offset $T_{offset,cell}$ in the current active subframe;

determining, according to the configuration information of the PUCCH, a frequency bandwidth occupied by the PUCCH, a frequency domain start location, and a frequency hopping rule in the frequency hopping period $T_{PUCCH}$;

calculating a quantity $N_{PUCCH}$ of frequency hops of the PUCCH in the time offset $T_{offset,cell}$, where $N_{PUCCH} = \lfloor N/T_{PUCCH} \rfloor$; and determining, according to the frequency bandwidth occupied by the PUCCH, the frequency domain start location, the frequency hopping rule in the frequency hopping period $T_{PUCCH}$, the quantity $N_{PUCCH}$ of frequency hops, and a frequency-domain resource for transmitting the PUCCH in the current active subframe.

In one embodiment, that the fourth frequency-domain resource determining module determines, according to the received configuration information of the PUCCH, the frequency-domain resource for transmitting the PUCCH further includes: after the time offset $T_{offset,cell}$ of the PUCCH in the current active subframe is calculated, if the configuration information of the PUCCH does not include a frequency-domain resource configured for the time offset $T_{offset,cell}$, determining that the frequency-domain resource for transmitting the PUCCH is a fixed frequency-domain resource of the PUCCH that is included in the configuration information of the PUCCH, where the fixed frequency-domain resource of the PUCCH includes a frequency bandwidth occupied by the PUCCH and a frequency domain start location.

In another embodiment, the first frequency-domain resource determining unit 8 includes a fifth frequency-domain resource determining module. That the fifth frequency-domain resource determining module determines, according to the received configuration information of the PUCCH, the frequency-domain resource for transmitting the PUCCH includes: obtaining a fixed frequency-domain resource included in the configuration information of the PUCCH, and determining the fixed frequency-domain resource as the frequency-domain resource for transmitting the PUCCH.

When the first frequency-domain resource determining unit 8 includes the fifth frequency-domain resource determining module, the first modulation unit 9 includes a first modulation module and a second modulation module.

The first modulation module is configured to: when the UE sends only the PUCCH, transmit the PUCCH using a subcarrier in the fixed frequency-domain resource.

The second modulation module is configured to: when the UE sends both the PUCCH and the SRS, transmit the PUCCH using a first-sequence subcarrier in the fixed frequency-domain resource, and transmit the SRS using a second-sequence subcarrier in the fixed frequency-domain resource; and in a process in which the UE sends only the SRS, if it is determined that the frequency-domain resource for transmitting the SRS and the frequency-domain resource for transmitting the PUCCH are overlapping, quit sending an SRS located on an overlapping frequency-domain resource, and then send both the PUCCH and the SRS that is located on the overlapping frequency-domain resource.

The first-sequence subcarrier is an odd-number sequence subcarrier in the fixed frequency-domain resource, and the second-sequence subcarrier is an even-number sequence subcarrier in the fixed frequency-domain resource, or the first-sequence subcarrier is an even-number sequence subcarrier in the fixed frequency-domain resource, and the second-sequence subcarrier is an odd-number sequence subcarrier in the fixed frequency-domain resource.

Figure 20:
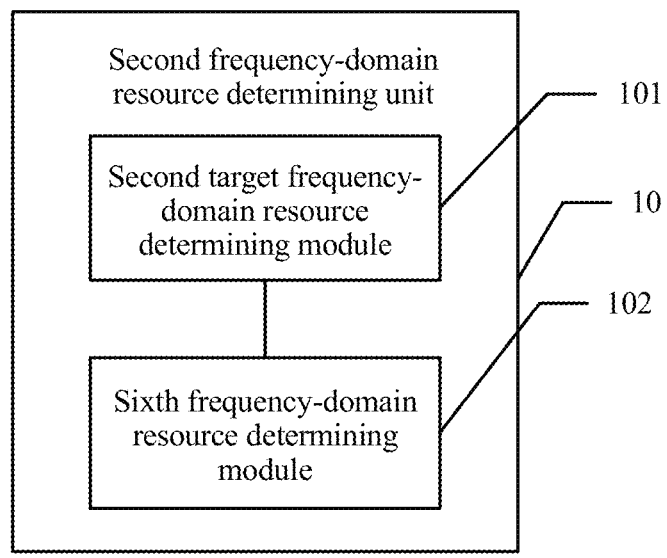
FIG. 20 is a schematic structural diagram of a second frequency-domain resource determining unit according to an embodiment of the present disclosure.

A structure of the second frequency-domain resource determining unit 10 in the foregoing data transmission apparatus applied to the user equipment according to an embodiment of the present disclosure is shown in FIG. 20. The second frequency-domain resource determining unit 10 includes a second target frequency-domain resource determining module 101 and a sixth frequency-domain resource determining module 102.

In one embodiment, the second target frequency-domain resource determining module 101 is configured to:

calculate a time offset $T'_{offset,cell}$ of the SRS in the current active subframe according to the sequence number N of the current active subframe and a minimum frequency hopping period $T_{SRS,cell}$ of the SRS in the configuration information of the SRS;

determine, according to the configuration information of the SRS, a frequency hopping period $T_{SRS}$ of the SRS corresponding to the time offset $T'_{offset,cell}$ in the current active subframe;

determine, according to the configuration information of the SRS, a frequency bandwidth occupied by the SRS, a frequency domain start location, and a frequency hopping rule in the frequency hopping period $T_{SRS}$;

calculate a quantity $N_{SRS}$ of frequency hops of the SRS in the time offset $T'_{offset,cell}$, where $N_{SRS}=\lfloor N/T_{SRS} \rfloor$; and determine, according to the frequency bandwidth occupied by the SRS, the frequency domain start location, and the frequency hopping rule in the frequency hopping period $T_{SRS}$, and the quantity $N_{SRS}$ of frequency hops, a target frequency-domain resource of the SRS in the current active subframe.

The sixth frequency-domain resource determining module 102 is specifically configured to determine, according to the target frequency-domain resource of the SRS, a frequency-domain resource for transmitting the SRS in the current active subframe.

There are a plurality of manners in which the sixth frequency-domain resource determining module 102 may determine, using the target frequency-domain resource of the SRS, the frequency-domain resource for transmitting the SRS in the current active subframe. Separate descriptions are provided in the following.

in one embodiment, the sixth frequency-domain resource determining module 102 is specifically configured to: when the target frequency-domain resource of the SRS is located on a non-edge area of an SRS resource pool, and the target frequency-domain resource of the SRS and the frequency-domain resource for transmitting the PUCCH are not overlapped, determine the target frequency-domain resource of the SRS as a frequency-domain resource for transmitting the SRS in the current active subframe.

In one embodiment, the second modulation unit 11 is configured to modulate the SRS on the determined frequency-domain resource using a pre-stored ZC sequence.

In one embodiment, the sixth frequency-domain resource determining module 102 is specifically configured to: when the target frequency-domain resource of the SRS is located on an edge area of an SRS resource pool, and target frequency-domain resource of the SRS and the frequency-domain resource for transmitting the PUCCH are not overlapped, determine the target frequency-domain resource of the SRS and a to-be-bundled frequency-domain resource as the frequency-domain resource for transmitting the SRS in the current active subframe. The to-be-bundled frequency-domain resource is an idle frequency-domain resource, in frequency-domain resources in a communications system, that is not covered by the SRS resource pool and that is adjacent to the target frequency-domain resource.

In one embodiment, the second modulation unit 11 is configured to: extend a pre-stored ZC sequence, where a length of the extended ZC sequence is $(n+m1) \times 6$, where n is a quantity of resource groups included in the target frequency-domain resource of the SRS, and m1 is a quantity of resource groups included in the to-be-bundled frequency-domain resource; and modulate, using the extended ZC sequence, the SRS on the determined frequency-domain resource.

In one embodiment, the sixth frequency-domain resource determining module 102 is specifically configured to: when there is an overlapped area between the target frequency-domain resource of the SRS and the frequency-domain resource occupied by the PUCCH, and frequency-domain resources that are in the target frequency-domain resource of the SRS and that are not overlapped with the frequency-domain resource occupied by the PUCCH are continuous frequency-domain resources, use the frequency-domain resources that are in the target frequency-domain resource of the SRS and that are not overlapped with the frequency-domain resource occupied by the PUCCH as the frequency-domain resource for transmitting the SRS in the current active subframe.

In one embodiment, the second modulation unit 11 is specifically configured to: compress a pre-stored ZC sequence, where a length of the compressed ZC sequence is $(n-m2) \times 6$, where m2 is a quantity of resource groups included in the overlapping area between the target frequency-domain resource of the SRS and the frequency-domain resource occupied by the PUCCH; and modulate, using the compressed ZC sequence, the SRS on the determined frequency-domain resource.

In one embodiment, the sixth frequency-domain resource determining module 102 is specifically configured to: when there is an overlapping area between the target frequency-domain resource of the SRS and the frequency-domain resource of the PUCCH, and the frequency-domain resource of the PUCCH separates the target frequency-domain resource of the SRS into a first frequency-domain resource and a second frequency-domain resource, use, according to a preset rule, one or more of the first frequency-domain resource and the second frequency-domain resource as the frequency-domain resource for transmitting the SRS in the current active subframe.

In one embodiment, the second modulation unit 11 is specifically configured to: compress a pre-stored ZC sequence, where a length of the compressed ZC sequence is $n1 \times 6$, where n1 is a quantity of resource groups included in the frequency-domain resource for transmitting the SRS in the current active subframe; and modulate, using the compressed ZC sequence, the SRS on the determined frequency-domain resource.

An embodiment of the present disclosure further discloses user equipment, and the user equipment includes the foregoing data transmission apparatus applied to the user equipment.

Figure 21:
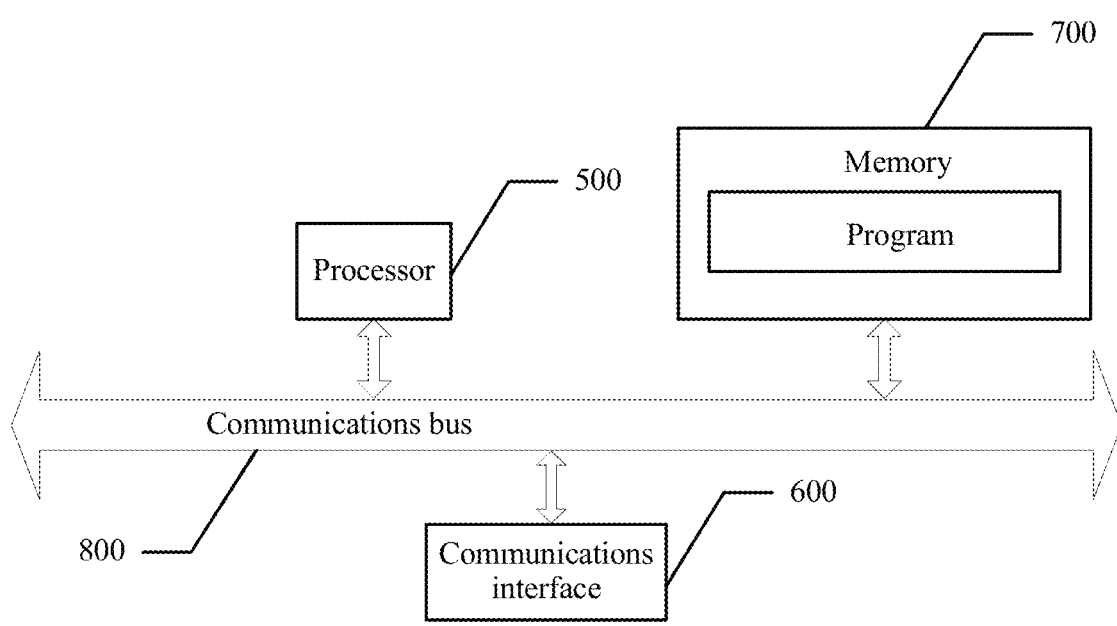
FIG. 21 is a schematic structural diagram of hardware of user equipment according to an embodiment of the present disclosure.

Referring to FIG. 21, FIG. 21 shows a structure of hardware of the user equipment. The user equipment includes a processor 500, a communications interface 600, a memory 700, and a communications bus 800.

The processor 500 is configured to execute a program. The communications interface 600 is configured to send and receive data. The memory 700 is configured to store the program. The processor 500, the communications interface 600, and the memory 700 complete mutual communication using the communications bus 800. The processor 500 may be a central processing unit CPU, or an application-specific integrated circuit ASIC (Application Specific Integrated Circuit), or one or more integrated circuits configured to implement this embodiment of the present disclosure. The memory 700 may include a high-speed RAM memory, or may include a nonvolatile memory (non-volatile memory) such as at least one magnetic disk storage.

In one embodiment, the program is configured to:

determine, according to configuration information of a PUCCH that is received by the communications interface, a frequency-domain resource for transmitting the PUCCH;

control the communications interface to transmit the PUCCH using a subcarrier in the determined frequency-domain resource, where the PUCCH is mapped to a last symbol of a subframe; and determine, according to configuration information of an SRS that is received by the communications interface, a frequency-domain resource for transmitting the SRS, and control the communications interface to transmit the SRS using a subcarrier in the determined frequency-domain resource, where the SRS is mapped to the last symbol of the subframe.

If the functions of the method in the embodiment are implemented in the form of a software functional unit and sold or used as an independent product, the functions may be stored in a computing device-readable storage medium. Based on such an understanding, the part of the embodiments of this application contributing to the prior art or some of the technical solutions may be implemented in a form of a software product. The software product is stored in a storage medium, and includes several instructions for instructing a computing device (which may be a personal computer, a server, or a network device) to perform all or some of the operations of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The embodiments in this specification are all described in a progressive manner, for same or similar parts in the embodiments, reference may be made to these embodiments, and each embodiment focuses on a difference from other embodiments.

The embodiments disclosed above are described to enable a person skilled in the art to implement or use this application. Various modifications made to the embodiments will be obvious to a person skilled in the art, and the general principles defined herein may also be implemented in other embodiments without departing from the spirit or scope of this application. Therefore, this application is not intended to be limited to these embodiments illustrated herein, but shall be construed in the widest scope consistent with the principles and novel features disclosed herein.

What is claimed is:

1. A data transmission apparatus, comprising:
an information configuration circuit, configured to determine configuration information of a physical uplink control channel (PUCCH) and configuration information of an uplink sounding reference signal (SRS), wherein the configuration information of the PUCCH indicates a frequency-domain resource for transmitting the PUCCH, the configuration information of the SRS indicates a frequency-domain resource for transmitting the SRS, wherein the frequency-domain resource for transmitting the PUCCH and the frequency-domain resource for transmitting the SRS in a same subframe are different, wherein the PUCCH is mapped to a last symbol of the subframe, wherein the SRS is mapped to the last symbol of the subframe, and wherein the information configuration circuit comprises a first information configuration module, wherein the configuration information of the SRS, determined by the first information configuration module, comprises: a minimum frequency hopping period of the SRS, frequency hopping periods of the SRS that are configured in different time offsets, a frequency bandwidth occupied by the SRS, a frequency domain start location, and a frequency hopping rule in each frequency hopping period of the SRS, and wherein, the configuration information of the PUCCH, determined by the first information configuration module, comprises: a minimum frequency hopping period of the PUCCH, wherein the minimum frequency hopping period of the PUCCH is the same as the minimum frequency hopping period of the SRS; frequency hopping periods of the PUCCH that are configured in different time offsets, wherein a frequency hopping period of the PUCCH and a frequency hopping period of the SRS that are configured in a same time offset are the same; and a frequency bandwidth occupied by the PUCCH, a frequency domain start location, and a frequency hopping rule in each frequency hopping period of the PUCCH, wherein the frequency hopping rule of the PUCCH is the same as the frequency hopping rule of the SRS, the frequency domain start location of the SRS is outside the frequency-domain resource of the PUCCH, and an initial frequency-domain resource of the SRS and an initial frequency-domain resource of the PUCCH are not overlapped;
a data sending circuit, configured to send the configuration information of the PUCCH and the configuration information of the SRS to user equipment (UE) in a cell;
a first subcarrier receiving circuit, configured to receive, according to the configuration information of the PUCCH, a subcarrier that carries the PUCCH sent by the UE, wherein the first subcarrier receiving circuit comprises a first frequency-domain resource determining module, configured to determine, according to the configuration information of the PUCCH, a frequency-domain resource occupied by the subcarrier that carries the PUCCH in a current subframe and a first subcarrier receiving module, configured to receive the subcarrier in the frequency-domain resource, wherein, the first frequency-domain resource determining module determining, according to the configuration information of the PUCCH, a frequency-domain resource occupied by the subcarrier that carries the PUCCH in a current subframe comprises:
calculating a time offset $T_{offset,cell}$ of the PUCCH in the current subframe according to a sequence number N of the current subframe and the minimum frequency hopping period $T_{PUCCH,cell}$ of the PUCCH, wherein $T_{offset,cell}$=N mod $T_{PUCCH,cell}$;
a first demodulation circuit, configured to demodulate the subcarrier that carries the PUCCH to obtain the PUCCH;
a second subcarrier receiving circuit, configured to receive, according to the configuration information of the SRS, a subcarrier that carries the SRS sent by the UE; and
a second demodulation circuit, configured to demodulate the subcarrier that carries the SRS to obtain the SRS.

2. The data transmission apparatus according to claim 1, wherein the configuration information, determined by the first information configuration module, of the PUCCH further comprises: a fixed frequency-domain resource of the PUCCH, and wherein the fixed frequency-domain resource of the PUCCH comprises a frequency bandwidth occupied by the PUCCH and a frequency domain start location.

3. The data transmission apparatus according to claim 1, wherein the first subcarrier receiving circuit further performs the operations of:
determining a frequency hopping period $T_{PUCCH}$ of the PUCCH corresponding to the time offset $T_{offset,cell}$ in the current subframe;
determining a frequency bandwidth occupied by the PUCCH, a frequency domain start location, and a frequency hopping rule in the frequency hopping period $T_{PUCCH}$;

calculating a quantity $N_{PUCCH}$ of frequency hops of the PUCCH in the time offset $T_{offset,cell}$, wherein $N_{PUCCH}\lfloor N/T_{PUCCH} \rfloor$; and determining, according to the frequency bandwidth occupied by the PUCCH, the frequency domain start location, the frequency hopping rule in the frequency hopping period $T_{PUCCH}$, the quantity $N_{PUCCH}$ of frequency hops, and the frequency-domain resource occupied by the subcarrier that carries the PUCCH in the current subframe.

4. The data transmission apparatus according to claim 3, wherein the first frequency-domain resource determining module determining, according to the configuration information of the PUCCH, a frequency-domain resource occupied by the subcarrier that carries the PUCCH in a current subframe further comprises:

after the time offset $T_{offset,cell}$ of the PUCCH in the current subframe is calculated, if no corresponding frequency-domain resource is configured for the time offset $T_{offset,cell}$, determining that the frequency-domain resource occupied by the subcarrier that carries the PUCCH in the current subframe is a preconfigured fixed frequency-domain resource of the PUCCH.

5. The data transmission apparatus according to claim 1, wherein the second subcarrier receiving circuit comprises: a first target frequency-domain resource determining module, configured to determine, according to the configuration information of the SRS, a target frequency-domain resource occupied by the subcarrier that carries the SRS in a current subframe; a second frequency-domain resource determining module, configured to determine, based on the target frequency-domain resource, a frequency-domain resource occupied by the subcarrier that carries the SRS in the current subframe; and a second subcarrier receiving module, configured to receive the subcarrier in the frequency-domain resource determined by the second frequency-domain resource determining module, wherein the target frequency-domain resource determining module determining, according to the configuration information of the SRS, a target frequency-domain resource occupied by the subcarrier that carries the SRS in a current subframe comprises:

calculating a time offset $T'_{offset,cell}$ of the SRS in the current subframe according to a sequence number N of the current subframe and the minimum frequency hopping period $T_{SRS,cell}$ of the SRS, wherein $T'_{offset,cell} = N \bmod T_{SRS,cell}$;

determining a frequency hopping period $T_{SRS}$ of the SRS corresponding to the time offset $T'_{offset,cell}$ in the current subframe;

determining a frequency bandwidth occupied by the SRS, a frequency domain start location, and a frequency hopping rule in the frequency hopping period $T_{SRS}$;

calculating a quantity $N_{SRS}$ of frequency hops of the SRS in the time offset $T'_{offset,cell}$, wherein $N_{SRS} = \lfloor N/T_{SRS} \rfloor$; and determining, according to the frequency bandwidth occupied by the SRS, the frequency domain start location, and the frequency hopping rule in the frequency hopping period $T_{SRS}$, the quantity $N_{SRS}$ of frequency hops, and the target frequency-domain resource occupied by the subcarrier that carries the SRS in the current subframe.

6. The data transmission apparatus according to claim 5, wherein the second frequency-domain resource determining module is configured to: when the target frequency-domain resource is located on an edge area of an SRS resource pool, determine the target frequency-domain resource and a to-be-bundled frequency-domain resource as the frequency-domain resource occupied by the subcarrier that carries the SRS, wherein the to-be-bundled frequency-domain resource is a frequency-domain resource in a communications system, which is not covered by the SRS resource pool and that is adjacent to the target frequency-domain resource; and the second demodulation circuit is configured to: extend a pre-stored ZC sequence, and demodulate, using the extended ZC sequence, the subcarrier that carries the SRS to obtain the SRS, wherein a length of the extended ZC sequence is $(n+m1) \times 6$, wherein n is a quantity of resource groups comprised in the target frequency-domain resource, and m1 is a quantity of resource groups comprised in the to-be-bundled frequency-domain resource.

7. The data transmission apparatus according to claim 1, wherein the information configuration circuit comprises a second information configuration module, wherein the configuration information of the SRS, determined by the second information configuration module, comprises: a minimum frequency hopping period of the SRS in a cell, frequency hopping periods of the SRS that are configured in different time offsets, a frequency bandwidth occupied by the SRS, a frequency domain start location, and a frequency hopping rule in each frequency hopping period of the SRS, and wherein the configuration information of the PUCCH, determined by the second information configuration module, comprises: a fixed frequency-domain resource of the PUCCH, wherein the fixed frequency-domain resource of the PUCCH comprises a frequency bandwidth occupied by the PUCCH and a frequency domain start location.

8. The data transmission apparatus according to claim 7, wherein the second subcarrier receiving circuit comprises:

a first target frequency-domain resource determining module, configured to determine, according to the configuration information of the SRS, a target frequency-domain resource occupied by the subcarrier that carries the SRS in a current subframe;

a second frequency-domain resource determining module, configured to determine, based on the first target frequency-domain resource, a frequency-domain resource occupied by the subcarrier that carries the SRS in the current subframe; and a second subcarrier receiving module, configured to receive the subcarrier in the frequency-domain resource determined by the second frequency-domain resource determining module, wherein the target frequency-domain resource determining module determining, according to the configuration information of the SRS, a target frequency-domain resource occupied by the subcarrier that carries the SRS in a current subframe comprises:

calculating a time offset $T'_{offset,cell}$ of the SRS in the current subframe according to a sequence number N of the current subframe and the minimum frequency hopping period $T_{SRS,cell}$ of the SRS, wherein $T'_{offset,cell} = N \bmod T_{SRS,cell}$;

determining a frequency hopping period $T_{SRS}$ of the SRS corresponding to the time offset $T'_{offset,cell}$ in the current subframe;

determining a frequency bandwidth occupied by the SRS, a frequency domain start location, and a frequency hopping rule in the frequency hopping period $T_{SRS}$;

calculating a quantity $N_{SRS}$ of frequency hops of the SRS in the time offset $T'_{offset,cell}$, wherein $N_{SRS}=\lfloor N/T_{SRS} \rfloor$; and determining, according to the frequency bandwidth occupied by the SRS, the frequency domain start location, the frequency hopping rule in the frequency hopping period $T_{SRS}$, the quantity $N_{SRS}$ of frequency hops, and the target frequency-domain resource occupied by the subcarrier that carries the SRS in the current subframe.

9. The data transmission apparatus according to claim 8, wherein the second frequency-domain resource determining module is configured to: when the target frequency-domain resource and the frequency-domain resource of the PUCCH are not overlapped, and the target frequency-domain resource is located on a non-edge area of an SRS resource pool, determine the target frequency-domain resource as the frequency-domain resource occupied by the subcarrier that carries the SRS; and the second demodulation circuit is configured to demodulate, using a pre-stored ZC sequence, the subcarrier that carries the SRS to obtain the SRS.

10. The data transmission apparatus according to claim 8, wherein the second frequency-domain resource determining module is configured to: when the target frequency-domain resource and the frequency-domain resource of the PUCCH are not overlapped, and the target frequency-domain resource is located on an edge area of an SRS resource pool, determine the target frequency-domain resource and a to-be-bundled frequency-domain resource as the frequency-domain resource occupied by the subcarrier that carries the SRS, wherein the to-be-bundled frequency-domain resource is a frequency-domain resource, in a communications system, which is not covered by the SRS resource pool and that is adjacent to the target frequency-domain resource; and the second demodulation circuit is configured to: extend a pre-stored ZC sequence, and demodulate, using the extended ZC sequence, the subcarrier that carries the SRS to obtain the SRS, wherein a length of the extended ZC sequence is $(n+m1) \times 6$, wherein n is a quantity of resource groups comprised in the target frequency-domain resource, and m1 is a quantity of resource groups comprised in the to-be-bundled frequency-domain resource.

11. The data transmission apparatus according to claim 8, wherein the second frequency-domain resource determining module is configured to: when there is an overlapped area between the target frequency-domain resource and the frequency-domain resource of the PUCCH, and frequency-domain resources that are in the target frequency-domain resource and that are not overlapped with the frequency-domain resource of the PUCCH are continuous frequency-domain resources, determine the frequency-domain resources that are in the target frequency-domain resource and that are not overlapped with the frequency-domain resource of the PUCCH as the frequency-domain resource occupied by the subcarrier that carries the SRS; and the second demodulation circuit is configured to: compress a pre-stored ZC sequence, and demodulate, using the compressed ZC sequence, the subcarrier that carries the SRS to obtain the SRS, wherein a length of the compressed ZC sequence is $(n-m2) \times 6$, wherein n is a quantity of resource groups comprised in the target frequency-domain resource, and m2 is a quantity of resource groups comprised in the overlapped area between the target frequency-domain resource and the frequency-domain resource of the PUCCH.

12. The data transmission apparatus according to claim 8, wherein the second frequency-domain resource determining module is configured to: when there is an overlapped area between the target frequency-domain resource and the frequency-domain resource of the PUCCH, and the frequency-domain resource of the PUCCH separates the target frequency-domain resource into a first frequency-domain resource and a second frequency-domain resource, determine, according to a preset rule, one or more of the first frequency-domain resource and the second frequency-domain resource as the frequency-domain resource occupied by the subcarrier that carries the SRS; and the second demodulation circuit is configured to: compress a pre-stored ZC sequence, and demodulate, using the compressed ZC sequence, the subcarrier that carries the SRS to obtain the SRS, wherein a length of the compressed ZC sequence is $n1 \times 6$, wherein n1 is a quantity of resource groups comprised in the frequency-domain resource occupied by the subcarrier that carries the SRS.

13. The data transmission apparatus according to claim 7, wherein the first subcarrier receiving circuit comprises a third subcarrier receiving module, wherein the third subcarrier receiving module is configured to receive subcarriers in the fixed frequency-domain resource of the PUCCH; and the first demodulation circuit comprises a first demodulation module and a second demodulation module, wherein the first demodulation module is configured to: when it is determined that the received subcarriers sent by the UE carry only the PUCCH, demodulate the subcarriers in the fixed frequency-domain resource of the PUCCH to obtain the PUCCH; and the second demodulation module is configured to: when it is determined that the received subcarriers sent by the same UE carry both the PUCCH and the SRS, demodulate a first-sequence subcarrier in the fixed frequency-domain resource of the PUCCH to obtain the PUCCH, and demodulate a second-sequence subcarrier in the fixed frequency-domain resource to obtain the SRS, wherein the first-sequence subcarrier is an odd-number sequence subcarrier in the fixed frequency-domain resource, and the second-sequence subcarrier is an even-number sequence subcarrier in the fixed frequency-domain resource, or the first-sequence subcarrier is an even-number sequence subcarrier in the fixed frequency-domain resource, and the second-sequence subcarrier is an odd-number sequence subcarrier in the fixed frequency-domain resource.

14. A data transmission apparatus, comprising:

a data receiving circuit, configured to receive configuration information of a physical uplink control channel (PUCCH) and configuration information of an uplink sounding reference signal (SRS) that are sent by a base station, wherein the configuration information of the PUCCH indicates a frequency-domain resource for transmitting the PUCCH, and the configuration information of the SRS indicates a frequency-domain resource for transmitting the SRS;
a first frequency-domain resource determining circuit, configured to determine, according to the received configuration information of the PUCCH, the frequency-domain resource for transmitting the PUCCH, wherein the first frequency-domain resource determining circuit comprises a fourth frequency-domain resource determining module, wherein that the fourth frequency-domain resource determining module determining, according to the received configuration information of the PUCCH, the frequency-domain resource for transmitting the PUCCH comprises:
calculating a time offset $T_{offset,cell}$ of the PUCCH in a current active subframe according to a sequence number N of the current active subframe and a minimum frequency hopping period $T_{PUCCH,cell}$ of the PUCCH in the configuration information of the PUCCH, wherein $T_{offset,cell}=N \bmod T_{PUCCH,cell}$;
determining, according to the configuration information of the PUCCH, a frequency hopping period $T_{PUCCH}$ of the PUCCH corresponding to the time offset $T_{offset,cell}$ in the current active subframe;
a first modulation circuit, configured to transmit the PUCCH using a subcarrier in the frequency-domain resource determined by the first frequency-domain resource determining circuit, wherein the PUCCH is mapped to a last symbol of a subframe;
a second frequency-domain resource determining circuit, configured to determine, according to the received configuration information of the SRS, the frequency-domain resource for transmitting the SRS; and
a second modulation circuit, configured to transmit the SRS using a subcarrier in the frequency-domain resource determined by the second frequency-domain resource determining circuit, wherein the SRS is mapped to the last symbol of the subframe, wherein the configuration information of the SRS comprises: a minimum frequency hopping period of the SRS, frequency hopping periods of the SRS that are configured in different time offsets, a frequency bandwidth occupied by the SRS, a frequency domain start location, and a frequency hopping rule in each frequency hopping period of the SRS.

15. The data transmission apparatus according to claim 14, further comprising:
determining, according to the configuration information of the PUCCH, a frequency bandwidth occupied by the PUCCH, a frequency domain start location, and a frequency hopping rule in the frequency hopping period $T_{PUCCH}$;
calculating a quantity $N_{PUCCH}$ of frequency hops of the PUCCH in the time offset $T_{offset,cell}$, wherein $N_{PUCCH}=\lfloor N/T_{PUCCH} \rfloor$; and
determining, according to the frequency bandwidth occupied by the PUCCH, the frequency domain start location, the frequency hopping rule in the frequency hopping period $T_{PUCCH}$, the quantity $N_{PUCCH}$ of frequency hops, and a frequency-domain resource for transmitting the PUCCH in the current active subframe.

16. The data transmission apparatus according to claim 15, wherein the fourth frequency-domain resource determining module determining, according to the received configuration information of the PUCCH, the frequency-domain resource for transmitting the PUCCH further comprises:
after the time offset $T_{offset,cell}$ of the PUCCH in the current active subframe is calculated and if the configuration information of the PUCCH does not include a frequency-domain resource configured for the time offset $T_{offset,cell}$, determining that the frequency-domain resource for transmitting the PUCCH is a fixed frequency-domain resource of the PUCCH included in the configuration information of the PUCCH, wherein the fixed frequency-domain resource of the PUCCH comprises a frequency bandwidth occupied by the PUCCH and a frequency domain start location.

17. The data transmission apparatus according to claim 14, wherein the first frequency-domain resource determining circuit comprises a fifth frequency-domain resource determining module, wherein the fifth frequency-domain resource determining module determining, according to the received configuration information of the PUCCH, the frequency-domain resource for transmitting the PUCCH comprises:
obtaining a fixed frequency-domain resource comprised in the configuration information of the PUCCH, and determining the fixed frequency-domain resource as the frequency-domain resource for transmitting the PUCCH.

18. The data transmission apparatus according to claim 17, wherein the first modulation circuit comprises a first modulation module and a second modulation module;
the first modulation module is configured to: when the UE sends only the PUCCH, transmit the PUCCH using a subcarrier in the fixed frequency-domain resource; and
the second modulation module is configured to: when the UE sends both the PUCCH and the SRS, transmit the PUCCH using a first-sequence subcarrier in the fixed frequency-domain resource, and transmit the SRS using a second-sequence subcarrier in the fixed frequency-domain resource; and in a process in which the UE sends only the SRS, if it is determined that the frequency-domain resource for transmitting the SRS and the frequency-domain resource for transmitting the PUCCH are overlapped, quit sending an SRS located on an overlapped frequency-domain resource, and send both the PUCCH and the SRS that is located on the overlapping frequency-domain resource, wherein
the first-sequence subcarrier is an odd-number sequence subcarrier in the fixed frequency-domain resource, and the second-sequence subcarrier is an even-number sequence subcarrier in the fixed frequency-domain resource, or the first-sequence subcarrier is an even-number sequence subcarrier in the fixed frequency-domain resource, and the second-sequence subcarrier is an odd-number sequence subcarrier in the fixed frequency-domain resource.

* * * * *